(12) United States Patent
Adler

(10) Patent No.: US 11,059,442 B2
(45) Date of Patent: Jul. 13, 2021

(54) ADAPTIVE SIDE AIRBAG FOR PROTECTING OCCUPANTS IN A VEHICLE

(71) Applicant: TRW Vehicle Safety Systems Inc., Washington, MI (US)

(72) Inventor: Angelo J. Adler, Shelby Township, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 289 days.

(21) Appl. No.: 16/364,215

(22) Filed: Mar. 26, 2019

(65) Prior Publication Data

US 2020/0307484 A1    Oct. 1, 2020

(51) Int. Cl.
| | |
|---|---|
| *B60R 21/015* | (2006.01) |
| *B60R 21/207* | (2006.01) |
| *B60R 21/26* | (2011.01) |
| *B60R 21/237* | (2006.01) |
| *B60R 21/2338* | (2011.01) |
| *B60R 21/2334* | (2011.01) |
| *B60R 21/00* | (2006.01) |
| *B60R 21/01* | (2006.01) |

(52) U.S. Cl.
CPC ...... *B60R 21/01554* (2014.10); *B60R 21/207* (2013.01); *B60R 21/237* (2013.01); *B60R 21/2334* (2013.01); *B60R 21/2338* (2013.01); *B60R 21/26* (2013.01); *B60R 2021/0032* (2013.01); *B60R 2021/01286* (2013.01)

(58) Field of Classification Search
CPC . B60R 21/01554; B60R 21/207; B60R 21/26; B60R 21/237; B60R 21/2338; B60R 21/2334; B60R 2021/0032; B60R 2021/01286; B60R 2021/01238; B60R 2021/23384; B60R 2021/23146; B60R 21/23138
See application file for complete search history.

(56) References Cited

U.S. PATENT DOCUMENTS

| | | | | |
|---|---|---|---|---|
| 5,330,228 A | * | 7/1994 | Krebs | B60N 2/829 280/801.2 |
| 5,364,125 A | * | 11/1994 | Brown | B60R 21/21 280/730.2 |
| 5,584,508 A | * | 12/1996 | Maruyama | B60R 21/231 280/732 |

(Continued)

FOREIGN PATENT DOCUMENTS

JP        2014043128        3/2014

*Primary Examiner* — Paul N Dickinson
*Assistant Examiner* — Timothy Wilhelm
(74) *Attorney, Agent, or Firm* — Tarolli, Sundheim, Covell & Tummino LLP

(57) ABSTRACT

An apparatus for helping to protect an occupant of a vehicle includes an airbag configured to be mounted to a seat back of a vehicle seat. The airbag is inflatable between the seat back and an adjacent side structure of the vehicle to one of a first deployed condition in which the airbag is configured for a non-reclined condition of the vehicle seat, and a second deployed condition in which the airbag is configured for a reclined condition of the vehicle seat. The airbag is configured to deploy to the first deployed condition in response to determining a non-reclined condition of the vehicle seat and to the second deployed condition in response to determining a reclined condition of the vehicle seat.

22 Claims, 12 Drawing Sheets

(56) References Cited

U.S. PATENT DOCUMENTS

| | | | |
|---|---|---|---|
| 5,765,863 A * | 6/1998 | Storey | B60R 21/207 280/729 |
| 5,806,881 A * | 9/1998 | Richter | B60R 21/231 280/730.2 |
| 5,906,395 A * | 5/1999 | Isaji | B60R 21/237 280/743.1 |
| 6,142,517 A * | 11/2000 | Nakamura | B60R 21/23138 280/739 |
| 6,164,696 A * | 12/2000 | Ellerbrok | B60R 21/2342 280/729 |
| 6,196,585 B1 * | 3/2001 | Igawa | B60R 21/237 280/728.1 |
| 6,457,741 B2 * | 10/2002 | Seki | B60R 21/207 280/730.2 |
| 6,666,292 B2 * | 12/2003 | Takagi | B60R 21/01554 180/268 |
| 6,736,426 B2 * | 5/2004 | Winters | B60R 21/233 280/743.2 |
| 7,192,050 B2 * | 3/2007 | Sato | B60R 21/23138 280/729 |
| 7,434,832 B2 * | 10/2008 | Umehara | B60R 21/207 280/730.2 |
| 7,481,456 B2 * | 1/2009 | Nozaki | B60R 21/239 280/731 |
| 7,673,937 B2 * | 3/2010 | Core Almarza | B60R 21/2338 297/216.1 |
| 7,766,385 B2 * | 8/2010 | Fukawatase | B60R 21/2338 280/743.2 |
| 7,793,975 B2 * | 9/2010 | Fukawatase | B60R 21/237 280/743.1 |
| 7,946,616 B2 * | 5/2011 | Ochiai | B60R 21/23138 280/730.2 |
| 7,971,901 B2 * | 7/2011 | Tomitaka | B60R 21/232 280/730.2 |
| 7,988,187 B2 * | 8/2011 | Yamamura | B60R 21/232 280/730.2 |
| 8,181,989 B2 * | 5/2012 | Okuhara | B60R 21/235 280/730.2 |
| 8,353,528 B2 * | 1/2013 | Mizuno | B60R 21/235 280/730.2 |
| 8,382,151 B2 * | 2/2013 | Kalandek | B60R 21/232 280/730.2 |
| 8,528,934 B2 * | 9/2013 | Kobayshi | B60R 21/207 280/740 |
| 8,550,492 B2 * | 10/2013 | Gwon | B60R 21/23138 280/729 |
| 8,651,515 B2 * | 2/2014 | Baba | B60R 21/23138 280/730.2 |
| 8,684,401 B2 * | 4/2014 | Shibayama | B60R 21/2334 280/730.2 |
| 8,727,375 B2 * | 5/2014 | Suzuki | B60R 21/23138 280/730.2 |
| 8,777,257 B2 * | 7/2014 | Fukawatase | B60R 21/2334 280/730.2 |
| 8,783,712 B2 * | 7/2014 | Fukushima | B60R 21/233 280/730.2 |
| 9,010,804 B2 * | 4/2015 | Witt, Jr. | B60R 21/2171 280/743.2 |
| 9,039,035 B1 * | 5/2015 | Faruque | B60R 21/207 280/728.2 |
| 9,039,037 B2 * | 5/2015 | Fukushima | B60R 21/2346 280/730.2 |
| 9,056,591 B2 * | 6/2015 | Fujiwara | B60R 21/2346 |
| 9,067,558 B2 * | 6/2015 | Akiyama | B60R 21/207 |
| 9,085,280 B2 * | 7/2015 | Katsumata | B60R 21/2342 |
| 9,108,587 B2 * | 8/2015 | Rickenbach | B60R 21/233 |
| 9,120,457 B2 * | 9/2015 | Kino | B60R 21/233 |
| 9,211,824 B2 * | 12/2015 | Arant | B60N 2/0244 |
| 9,238,446 B2 * | 1/2016 | Azuma | B60R 21/237 |
| 9,296,353 B1 * | 3/2016 | Choi | B60R 21/01554 |
| 9,409,542 B2 * | 8/2016 | Fujiwara | D05B 13/00 |
| 9,457,759 B2 * | 10/2016 | Sugimoto | B60R 21/23138 |
| 9,463,760 B2 | 10/2016 | Choi et al. | |
| 9,573,551 B1 * | 2/2017 | Wang | B60R 21/23138 |
| 9,598,042 B2 * | 3/2017 | Schneider | B60R 21/231 |
| 9,616,841 B2 * | 4/2017 | Futai | B60R 21/23138 |
| 9,682,681 B1 * | 6/2017 | Patel | B60R 21/01512 |
| 9,694,723 B2 * | 7/2017 | Shimizu | B60N 2/66 |
| 9,707,922 B2 * | 7/2017 | Wiik | B60R 21/2346 |
| 9,771,045 B2 * | 9/2017 | Fujiwara | B60R 21/23138 |
| 9,796,351 B2 * | 10/2017 | Fujiwara | B60R 21/207 |
| 9,849,857 B2 * | 12/2017 | Fujiwara | B60R 21/233 |
| 9,849,858 B2 * | 12/2017 | Inazumi | B60R 21/2338 |
| 9,873,399 B2 * | 1/2018 | Goto | B60R 21/231 |
| 9,932,011 B2 * | 4/2018 | Hiraiwa | B60R 21/207 |
| 9,969,351 B2 * | 5/2018 | Ohno | B60R 21/207 |
| 9,981,622 B2 | 5/2018 | Ohmura | |
| 10,017,148 B2 * | 7/2018 | Hayashi | B60R 21/237 |
| 10,023,147 B2 * | 7/2018 | Kwon | B60R 21/216 |
| 10,035,485 B2 * | 7/2018 | Fujiwara | B60R 21/2165 |
| 10,106,122 B2 * | 10/2018 | Komatsu | B60R 21/237 |
| 10,179,527 B2 * | 1/2019 | Uno | B60N 2/90 |
| 10,207,668 B2 * | 2/2019 | Goto | B60R 21/207 |
| 10,207,670 B2 * | 2/2019 | Attenberger | B60R 21/23138 |
| 10,343,638 B2 * | 7/2019 | Fukawatase | B60R 21/237 |
| 10,369,956 B2 * | 8/2019 | Deng | B60R 21/2338 |
| 10,369,957 B2 * | 8/2019 | Hatakeyama | B60R 21/23138 |
| 10,493,940 B2 * | 12/2019 | Sugishima | B60R 21/233 |
| 10,518,738 B2 * | 12/2019 | Kobayashi | B60R 21/233 |
| 10,543,805 B2 * | 1/2020 | Hiraiwa | B60R 21/2338 |
| 10,596,992 B2 * | 3/2020 | Choi | B60R 21/263 |
| 10,737,648 B2 * | 8/2020 | Nagasawa | B60R 21/203 |
| 10,821,928 B2 * | 11/2020 | Deng | B60R 21/01554 |
| 10,926,675 B2 * | 2/2021 | Hopfner | B60N 2/34 |
| 2004/0232682 A1 * | 11/2004 | Keshavaraj | B60R 21/235 280/743.1 |
| 2007/0284859 A1 * | 12/2007 | Kashiwagi | B60R 21/207 280/730.2 |
| 2008/0290637 A1 * | 11/2008 | Mueller | B60R 21/207 280/736 |
| 2012/0038135 A1 * | 2/2012 | Oomori | B60R 21/23138 280/730.2 |
| 2013/0079208 A1 * | 3/2013 | Wiik | B60R 21/237 493/405 |
| 2014/0042733 A1 * | 2/2014 | Fukawatase | B60R 21/0136 280/730.2 |
| 2014/0103625 A1 * | 4/2014 | Thomas | B60R 21/2346 280/730.2 |
| 2015/0115583 A1 * | 4/2015 | Azuma | B60R 21/233 280/740 |
| 2015/0183393 A1 * | 7/2015 | Kino | B60R 21/233 280/729 |
| 2015/0217714 A1 * | 8/2015 | Fujiwara | B60R 21/235 280/729 |
| 2015/0367804 A1 * | 12/2015 | Fujiwara | B60R 21/23138 280/730.2 |
| 2015/0367806 A1 * | 12/2015 | Fujiwara | B60R 21/239 280/729 |
| 2016/0107604 A1 * | 4/2016 | Fujiwara | B60R 21/23138 280/729 |
| 2016/0347222 A1 * | 12/2016 | Uno | B60N 2/665 |
| 2017/0113645 A1 * | 4/2017 | Hayashi | B60R 21/237 |
| 2018/0290619 A1 * | 10/2018 | Kitagawa | B60R 21/207 |
| 2019/0001916 A1 * | 1/2019 | Jo | B60R 21/23138 |
| 2019/0111880 A1 * | 4/2019 | Choi | B60R 21/2338 |
| 2019/0111884 A1 * | 4/2019 | Kobayashi | B60R 21/23138 |
| 2019/0375365 A1 * | 12/2019 | Kobayashi | B60R 21/23138 |
| 2020/0094770 A1 * | 3/2020 | Fischer | B60R 21/231 |

* cited by examiner

ADAPTIVE SIDE AIRBAG FOR PROTECTING OCCUPANTS IN A VEHICLE

Field of the Invention

The invention relates to an apparatus for helping to protect an occupant of a vehicle. More particularly, the invention relates to an airbag inflatable between a portion of a vehicle and a vehicle occupant. In one configuration, the invention relates to an airbag inflatable between a side structure of a vehicle and a vehicle occupant.

BACKGROUND OF THE INVENTION

It is known to inflate an airbag to help protect a vehicle occupant in the event of a side impact to a vehicle. The airbag is, commonly, stored in a deflated condition, together with an inflator, in a vehicle seat in which the occupant is seated. In the event of a side impact to the vehicle of a magnitude above a predetermined threshold, the inflator is actuated and the airbag is inflated into a position between the vehicle occupant and an adjacent side structure of the vehicle, such as an adjacent vehicle door. The airbag can help protect the vehicle occupant from forcefully striking or being struck by parts of the vehicle such as the door. The airbag can also help protect the vehicle occupant from objects which might intrude through the door or a side window of the vehicle during the side impact.

Further, typical vehicle seats can recline, to a degree selected by the occupant, in a range that spans from an upright condition to a reclined condition. The reclined position of the occupant affects his/her position relative to airbags within the vehicle, such as a curtain airbag and/or a side airbag. Some airbags, however, inflate and deploy to the same deployed condition regardless of whether the occupants are upright or reclined. This deployed condition might not be optimal in helping to protect both a reclined occupant and an upright occupant.

SUMMARY OF THE INVENTION

According to one aspect, an apparatus for helping to protect an occupant of a vehicle includes an airbag configured to be mounted to a seat back of a vehicle seat. The airbag is inflatable between the seat back and an adjacent side structure of the vehicle to one of a first deployed condition in which the airbag is configured for a non-reclined condition of the vehicle seat, and a second deployed condition in which the airbag is configured for a reclined condition of the vehicle seat. The airbag in the first deployed condition is configured to extend a first vertical distance along a length of the seat back. The airbag in the second deployed condition is configured to extend a second vertical distance along the length of the seat back. The second vertical distance is greater than the first vertical distance. The airbag is configured to deploy to the first deployed condition in response to determining a non-reclined condition of the vehicle seat and to the second deployed condition in response to determining a reclined condition of the vehicle seat.

According to another aspect, alone or in combination with any other aspect, the apparatus can further include an airbag module mounted to the seat back. The airbag module can include the airbag, a structure for supporting the airbag in the stored condition, and at least one inflator for inflating the airbag. A release mechanism can control whether the airbag deploys to the first deployed condition or the second deployed condition. The release mechanism can be releasably connected to a head portion of the airbag. In the first deployed condition, the connection between the release mechanism and the head portion can be maintained so that the airbag deploys to the first deployed condition. In the second deployed condition, the connection between the release mechanism and the head portion can be released so that the airbag deploys to the second deployed condition.

According to another aspect, alone or in combination with any other aspect, the connection of the release mechanism to the airbag can be direct or indirect.

According to another aspect, alone or in combination with any other aspect, the release mechanism can be releasably connected to an interior surface of the airbag at the head portion of the airbag.

According to another aspect, alone or in combination with any other aspect, as a result of the maintained connection of the release mechanism to the head portion of the airbag, a thorax portion of the airbag can inflate at least partially around the head portion of the airbag as the airbag deploys so that the head portion of the airbag can be inwardly folded into the thorax portion of the airbag when the airbag is in the first deployed condition.

According to another aspect, alone or in combination with any other aspect, the inwardly folded head portion of the airbag can form a space in a central portion of the thorax portion so that an inboard folded portion of the thorax portion can be separated from an outboard folded portion of the thorax portion by the space.

According to another aspect, alone or in combination with any other aspect, as a result of the maintained connection of the release mechanism to the head portion of the airbag, the head portion of the airbag can be substantially prevented from unfolding outward from the thorax portion in a roofward direction toward the second deployed condition.

According to another aspect, alone or in combination with any other aspect, the release mechanism can be indirectly connected to the head portion of the airbag through a tether. The tether can have a first tether end connected to a portion of the head portion of the airbag. At least one of a second tether end and a central tether portion can be releasably connected to the airbag module at the release mechanism. In the first deployed condition, the connection between the release mechanism and the tether can be maintained so that the airbag deploys to the first deployed condition. In the second deployed condition, the connection between the release mechanism and the tether can be released so that the airbag deploys to the second deployed condition.

According to another aspect, alone or in combination with any other aspect, the second tether end can be releasably connected to the airbag module at the release mechanism.

According to another aspect, alone or in combination with any other aspect, the first tether end can be connected to an interior surface of the airbag at the head portion of the airbag.

According to another aspect, alone or in combination with any other aspect, the second tether end can be connected to the interior surface of the airbag at a location that is opposite to the first tether end and the central tether portion can be releasably connected to the airbag module at the release mechanism. As a result of the first and second tether ends being connected to the interior surface of the airbag at opposing locations, the tether can shape the airbag when the airbag is deployed to the second deployed condition.

According to another aspect, alone or in combination with any other aspect, the apparatus can further include a sensor for sensing an angle of a seat back of the vehicle seat. The sensor can be in electrical communication with a controller for controlling operation of the release mechanism. The controller can be operative to determine from a signal from the sensor a reclined condition of the vehicle seat in response to determining that the angle of the seat back is greater than a predetermined angle at the time of a deployment event and to actuate the release mechanism to release the connection between the release mechanism and the head portion so that the airbag can deploy to the second deployed condition.

According to another aspect, alone or in combination with any other aspect, the apparatus can further include a sensor for sensing an angle of a seat back of the vehicle seat. The sensor can be in electrical communication with a controller for controlling operation of the release mechanism. The controller can be operative to determine from a signal from the sensor a non-reclined condition of the vehicle seat in response to determining that the angle of the seat back is below the predetermined angle at the time of a deployment event and to command the release mechanism to maintain the connection between the release mechanism and the head portion so that the airbag can deploy to the first deployed condition.

According to another aspect, alone or in combination with any other aspect, the apparatus can further include a first tether having a first end connected to the seat back via a release mechanism, and an opposite second end connected to a housing for storing the airbag when the airbag is in the stored condition. The first tether can have a first segment comprising a trigger tether and a second segment comprising an anchor tether. The trigger tether can comprise the first end of the first tether. The anchor tether can comprise the second end of the first tether. A second tether can comprise a shaping tether having a first end secured to the first tether by a releasable connection at a location between the first and second ends of the first tether. The second tether can have a second end connected to a head portion of the airbag. The release mechanism can control whether the airbag deploys to one of the first deployed condition and the second deployed condition. In the first deployed condition, the connection between the release mechanism and the trigger tether can be released so that the airbag can deploy to the first deployed condition. In the second deployed condition, the connection between the release mechanism and the trigger tether can be maintained so that the airbag can deploy to the second deployed condition.

According to another aspect, alone or in combination with any other aspect, in the first deployed condition, the connection between the release mechanism and the trigger tether can be released so that the releasable connection can maintain the connection between the anchor tether and the shaping tether. The anchor tether and the shaping tether in combination can hold the airbag in the first deployed condition so that the head portion of the airbag can be substantially prevented from unfolding outward in a roofward direction toward the second deployed condition. In the second deployed condition, the connection between the release mechanism and the trigger tether can be maintained so that the trigger tether can become tensioned by the shaping tether due to deployment of the airbag. The trigger tether when tensioned can rupture the releasable connection which can disconnect the shaping tether from the anchor tether and thereby permit the airbag to deploy to the second deployed condition.

According to another aspect, alone or in combination with any other aspect, the apparatus can further include a sensor for sensing an angle of a seat back of the vehicle seat. The sensor can be in electrical communication with a controller for controlling operation of the release mechanism. The controller can be operative to determine from a signal from the sensor a reclined condition of the vehicle seat in response to determining that the angle of the seat back is greater than a predetermined angle at the time of a deployment event and to command the release mechanism to maintain the connection between the release mechanism and the trigger tether so that the airbag can deploy to the second deployed condition.

According to another aspect, alone or in combination with any other aspect, the apparatus can further include a sensor for sensing an angle of a seat back of the vehicle seat. The sensor can be in electrical communication with a controller for controlling operation of the release mechanism. The controller can be operative to determine from a signal from the sensor a non-reclined condition of the vehicle seat in response to determining the angle of the seat back is below the predetermined angle at the time of a deployment event and to actuate the release mechanism to release the connection between the release mechanism and the trigger tether so that the airbag can deploy to the first deployed condition.

According to another aspect, alone or in combination with any other aspect, the airbag can comprise a thorax portion for covering the thorax of the occupant and a head portion for covering the head of the occupant. The thorax portion can be inflated and deployed while the head portion is substantially restricted from being inflated and deployed when the airbag is in the first deployed condition. Both the thorax and head portions can be inflated and deployed when the airbag is in the second deployed condition.

According to another aspect, alone or in combination with any other aspect, the apparatus can further include a curtain airbag contained in a side structure of the vehicle when the curtain airbag is in the stored condition. The curtain airbag can be inflatable from the stored condition to a deployed condition in which the curtain airbag can be deployed between the side structure and the vehicle occupant. When the vehicle seat is in the non-reclined condition at the time of a deployment event, the curtain airbag can cover the head of the occupant while the thorax portion of the airbag covers the thorax of the occupant. When the vehicle seat is in the reclined condition at the time of a deployment event, the thorax portion of the airbag can cover the thorax of the occupant while one of the head portion and a combination of the head portion and the curtain airbag covers the head of the occupant.

According to another aspect, alone or in combination with any other aspect, an airbag module can include the apparatus.

According to another aspect, alone or in combination with any other aspect, a vehicle safety system can include the airbag module.

According to another aspect, alone or in combination with any other aspect, a vehicle safety system for helping to protect an occupant of a driverless vehicle can include the airbag module.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
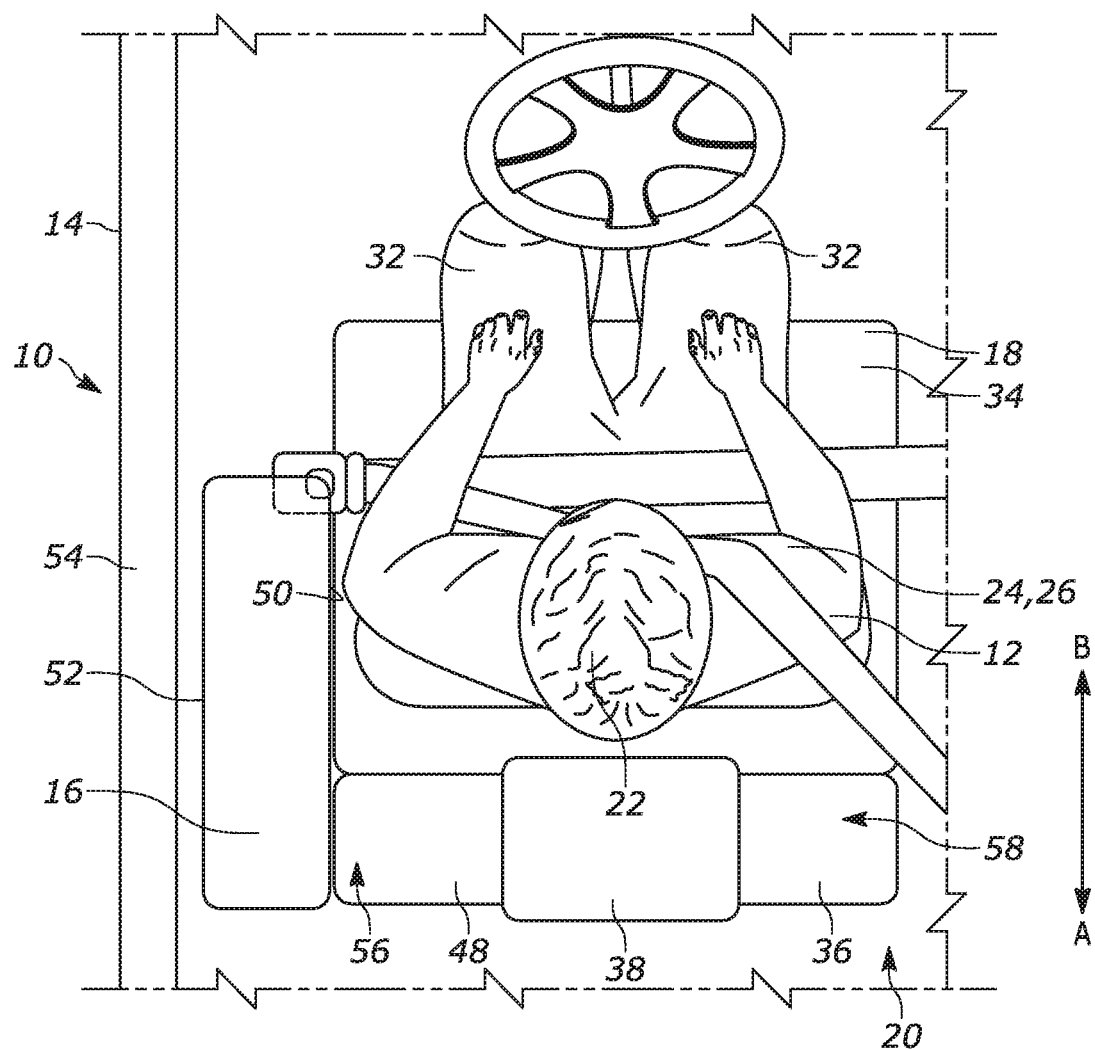
FIG. 1 is a schematic top view illustrating an apparatus for helping to protect an occupant of a vehicle, according to an embodiment of the invention.

An apparatus 10 for helping to protect an occupant 12 of a vehicle 14 includes an inflatable vehicle occupant protection device 16 in the form of an airbag, such as a side airbag, for helping to protect the occupant 12 in the event of a side impact to the vehicle. In the embodiment illustrated in FIGS. 1-3, the side airbag 16 is a side airbag for helping to protect an occupant 12 of a front vehicle seat 18 on a driver side 20 of the vehicle 14. Those skilled in the art will appreciate that the apparatus 10 disclosed herein could be adapted for a passenger side vehicle occupant (not shown) or occupants of rearward rows of the vehicle 14, such as a $2^{nd}$ row, $3^{rd}$ row, etc., of the vehicle (not shown).

The occupant 12 has a head 22, a torso 24, which includes a thorax 26, a pelvic area 28, which includes hips 30, and legs 32 extending from the hips 30. The vehicle 14 includes the vehicle seat 18 having a seat base 34, a reclinable seat back 36, and a headrest 38. The vehicle 14 also includes a windshield 40, a vehicle roof 42, a vehicle floor 44, and an instrument panel 46. The seat back 36 is typically positioned in either an upright condition, alternatively referred to as a non-reclined condition, (FIG. 2) or a reclined condition (FIG. 3), and thus the occupant 12 is usually either positioned in an upright (FIG. 2) or a reclined (FIG. 3) condition, respectively.

The side airbag 16 can be constructed of any suitable material, such as nylon (e.g., woven nylon 6-6 yarns), and can be constructed in any suitable manner. For example, the side airbag 16 can include one or more pieces or panels of material. If more than one piece or panel is used, the pieces or panels can be interconnected by known means, such as stitching, ultrasonic welding, heat bonding, or adhesives, to form the side airbag 16. The side airbag 16 can be uncoated, coated with a material, such as a gas impermeable urethane, or laminated with a material, such as a gas impermeable film. The side airbag 16 thus can have a gas-tight or substantially gas-tight construction. Those skilled in the art will appreciate that alternative materials, such as polyester yarn, and alternatives coatings, such as silicone, can also be used to construct the side airbag 16.

The side airbag 16 is mounted to a support structure 48 of the vehicle 14. The side airbag 16 is inflatable and deployable from a stored condition away from the support structure 48 toward a deployed condition in which the side airbag has an inboard panel 50 presented facing the occupant 12 and an outboard panel 52 presented facing an adjacent side structure 54 of the vehicle 14. The adjacent side structure 54 can be, for example, a vehicle door and/or any portion of an interior side wall of the vehicle 14. The support structure 48 can be any structure in the vehicle 14 that will accommodate the side airbag 16 being deployed therefrom so that the inboard panel 50 of the deployed side airbag 16 is presented facing the outboard side of the occupant 12 and the outboard panel 52 is presented facing the side structure 54 of the vehicle 14 adjacent the occupant.

For example, those skilled in the art will appreciate that the apparatus 10 disclosed herein can be used to help protect front row occupants of driverless, autonomous, semi-autonomous, automated, and/or semi-automated vehicles. In these vehicles, the occupant 12 could face a rearward direction, as indicated by an arrow identified at "A" in FIG. 1. In this case, the support structure 48 could be any structure that permits the inboard panel 50 of the deployed side airbag 16 to be presented facing the rearward facing the outboard side of the occupant 12 and the outboard panel 52 to be presented facing the side structure 54 adjacent the occupant.

Figure 2:
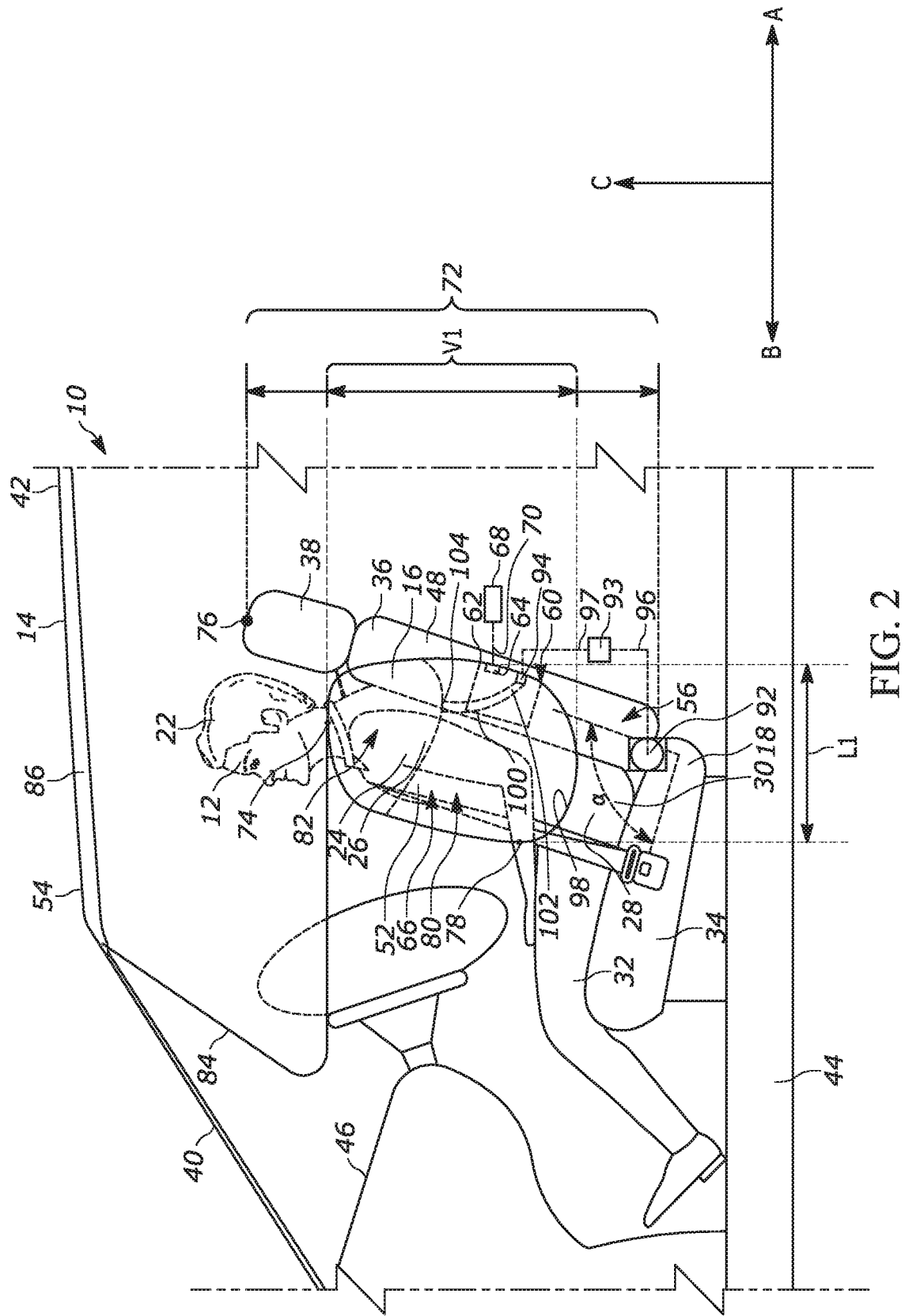
FIG. 2 is a schematic side view illustrating the apparatus of FIG. 1 in a first condition, including a first configuration for a portion of the apparatus.
Figure 3:
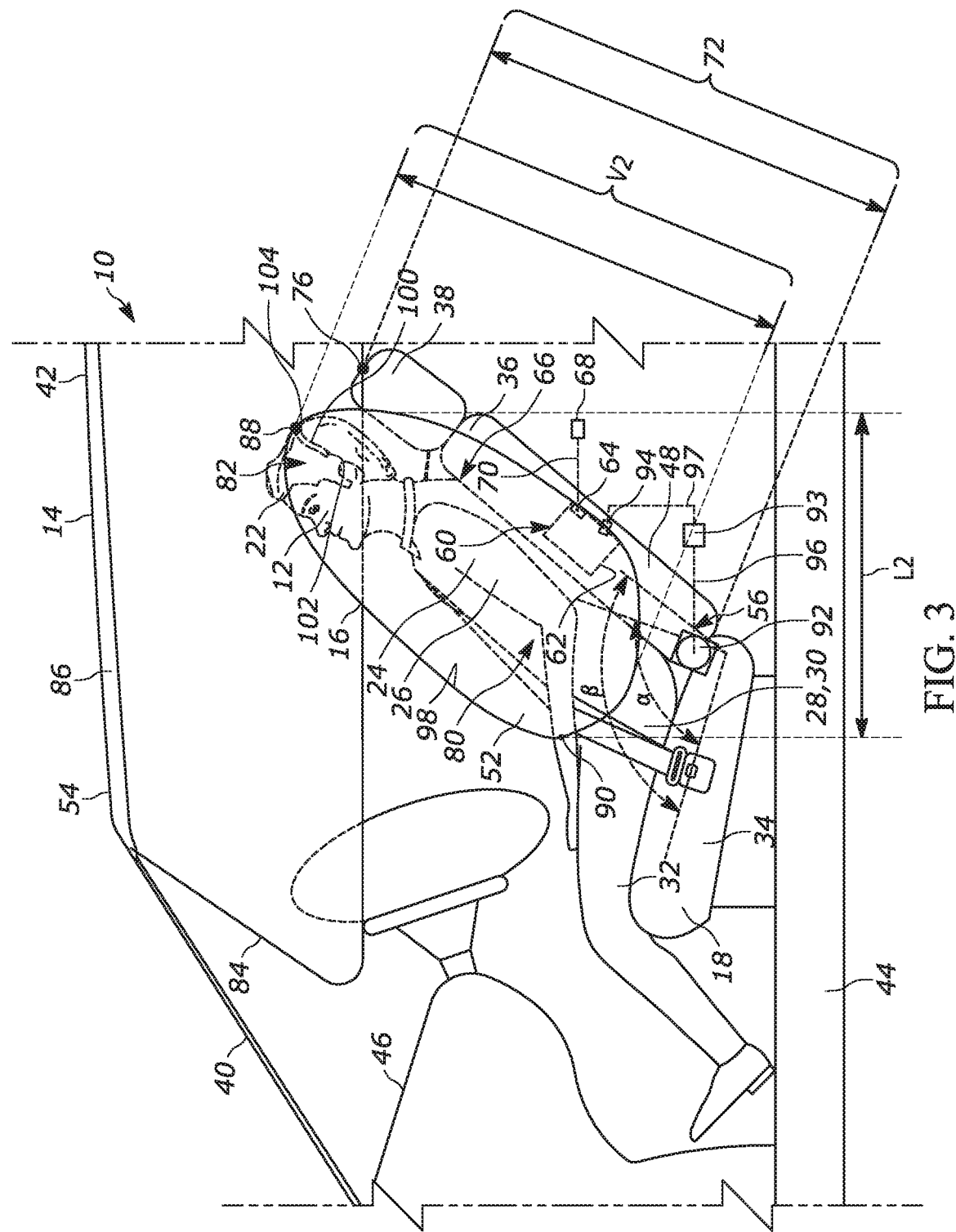
FIG. 3 is a schematic side view illustrating the apparatus of FIG. 2 in a second condition.

In the configuration shown in FIGS. 1-3, the support structure 48 can be a seat frame on an outboard side 56 of the seat back 36. The outboard side 56 of the seat back 36 is the side of the seat back that faces outward from the vehicle 14 and is adjacent to, and faces, the side structure 54 of the vehicle, regardless of whether the vehicle seat 18 faces a forward direction, as indicated by an arrow identified at "B" in FIG. 1, or the rearward direction A. It is to be understood, however, that both the inboard side 58 and the outboard side 56 of the seat back frame can support the apparatus 10. This can account for a situation in which the occupant 12 is able to select whether the vehicle seat 18 faces the forward direction B or the rearward direction A. This can be the case, for example, with a swivel seat. In this case, the apparatus 10 that is on the outboard side 56 of the seat back 36 at the time of the deployment event can be configured to deploy while the apparatus that is on the inboard side 58 of the seat back at the time of the deployment event can be configured to not deploy.

As shown in FIGS. 2-3, the side airbag 16 is mounted to the seat back 36 so that the side airbag is configured to be contained in the seat back when the side airbag is in the stored condition. The side airbag 16 may be mounted to the seat back 36 in any manner known in the art. In particular, the side airbag 16 can be part of an airbag module 60 that is mounted to the seat back 36 and/or to structures within the seat back such as, but not limited to, a vehicle seat frame (not shown) and/or brackets (not shown) within the seat back. The airbag module 60 can include the side airbag 16, a structure 62, such as a housing, for supporting the side airbag in the stored condition, and at least one inflator 64 for inflating the side airbag. In the stored condition, the side airbag 16 is folded and placed in the housing 62. The side airbag 16 is inflatable to deploy from the stored condition away from the seat back 36 toward the adjacent side structure 54 of the vehicle 14.

The seat back 36 may have a rupturable seam (not shown) that is sewn to enclose the side airbag 16 and the airbag module 60 within the seat back when the side airbag is in the stored condition. The seam is rupturable to an opened condition to uncover an opening through which the side airbag 16 can be deployed through when the side airbag deploys from the stored condition.

The inflator 64 is actuatable to provide inflation fluid to an inflatable volume 66 of the side airbag 16 to inflate and deploy the side airbag to the deployed condition. The inflator 64 can be of any known type, such as stored gas, solid propellant, augmented, or hybrid. The apparatus 10 can include a collision sensor, illustrated schematically at 68, for sensing an event for which inflation of the side airbag 16 is desired, such as a collision. The inflator 64 is operatively connected to the collision sensor 68 via lead wires 70.

As shown in the configuration of FIGS. 1-3, when the side airbag 16 is inflated and deployed, the side airbag has the inboard panel 50 presented facing the occupant 12 and the outboard panel 52 presented facing and/or positioned against the adjacent side structure 54 in the vehicle 14. As shown in FIG. 1, the outboard panel 52 of the side airbag 16 engages and is supported on at least a portion of the side structure 54. The side structure 54 provides a reaction surface against which the side airbag 16 is supported, and opposes the impact forces applied to the side airbag by the occupant 12.

To account for the occupant 12 being positioned in either the reclined or the upright conditions at the time of a deployment event of the side airbag 16, such as in the event of a vehicle collision, the side airbag is configured to adapt to the condition of the seat back 36, and accordingly, the upright/reclined condition of the occupant. In response to determining the upright/non-reclined condition of the seat back 36 of the vehicle seat 18, the side airbag 16 is configured to be inflatable to deploy from the stored condition to a first deployed condition in which the side airbag is configured for the upright/non-reclined condition of the seat back (FIG. 2). In response to determining the reclined condition of the seat back 36 of the vehicle seat 18, the side airbag 16 is configured to be inflatable to deploy from the stored condition to a second deployed condition in which the side airbag is configured for the reclined condition of the seat back (FIG. 3).

In the first deployed condition, the side airbag 16 has an upright orientation and is adapted to restrain an upright occupant 12. The outboard panel 52 of the side airbag 16 in the first deployed condition engages and is supported on at least a portion of the side structure 54. The side airbag 16 in the first deployed condition is configured to extend a first vertical distance V1 along a length 72 of the seat back 36 so that an upper extent 74 of the side airbag terminates below or at the headrest 38 of the vehicle seat 18. In the first deployed condition, the upper extent 74 of the side airbag 16 is vertically spaced further from the vehicle roof 42 than an upper extent 76 of the headrest 38 when the seat back 36 is in the upright condition. The side airbag 16 in the first deployed condition is also configured to extend a first longitudinal distance L1 measured from a forward extent 78 of the deployed side airbag toward a vehicle rearward direction. The first vertical distance V1 is greater than the first longitudinal distance L1, such that the side airbag 16 extends further in a roofward direction, as indicated by an arrow identified at "C" in FIG. 2, than it does in the rearward direction A.

The side airbag 16 has a thorax portion 80 that is inflated in the first deployed condition to cover the occupant's thorax 26 and help prevent the occupant's thorax 26 from impacting the side structure 54. The thorax portion 80 can also be configured to cover, in addition to the thorax 26, other portions of the occupant 12, such as, but not limited to, the occupant's torso 24. The side airbag 16 also includes a head portion 82 that is configured to cover the occupant's head 22. However, in the first deployed condition, the head portion 82 of the side airbag 16 is substantially restricted from being inflated and deployed, as will be discussed below. The restriction of the head portion 82 causes the side airbag 16 to extend the first vertical distance V1 when the side airbag deploys to the first deployed condition. Instead of the head portion 82 of the side airbag 16 covering the occupant's head 22 in the first deployed condition, the apparatus 10 includes an inflatable curtain airbag 84 that is configured to cover the occupant's head 22 when the curtain airbag is in a deployed condition.

The curtain airbag 84 is contained in a portion of the side structure 54 of the vehicle 14 when the curtain airbag is in a stored condition. For example, the curtain airbag 84 can be contained in a roof rail 86 of the vehicle 14 when the curtain airbag is in the stored condition. The curtain airbag 84 is inflatable from the stored condition to the deployed condition in which the curtain airbag is deployed between the side structure 54 and the occupant 12. In particular, the curtain airbag 84 is configured to be deployed between the side structure 54 and the occupant's head 22 to help prevent the occupant's head from impacting the side structure. Thus, when the seat back 36 of the vehicle seat 18 is in the upright/non-reclined condition at the time of a deployment event, the curtain airbag 84 covers the head 22 of the occupant 12 while the thorax portion 80 of the side airbag 16 covers the thorax 26 of the occupant.

However, as shown in FIG. 3, the occupant 12 can be positioned in the reclined condition instead of the upright condition. In this case, the spacing between the likely position of the reclined occupant's head 22 and the vehicle roof 42 is greater than the spacing between the likely position of the upright occupant's head and the vehicle roof. In other words, the likely position of the reclined occupant's head 22 is vertically lower or closer to the vehicle floor 44 than is the likely position of the upright/non-reclined occupant's head. Because the reclined occupant's head 22 is spaced further from the vehicle roof 42 than the upright occupant's head, at least a portion of the reclined occupant's head may fall vertically below the curtain airbag 84, and thus may not be adequately covered by the curtain airbag at the time of a deployment event.

To account for this, for a reclined occupant 12, the side airbag 16 can be deployed to the second deployed condition. The side airbag 16 in the second deployed condition is configured to extend further along the length 72 of the seat back 36 than the side airbag in the first deployed condition in order to cover the portions of the occupant's head left uncovered by the curtain airbag. The upper extent 88 of the side airbag 16 in the second deployed condition extends further in the roofward direction C than the upper extent 74 of the side airbag in the first deployed condition. This way, the side airbag 16 in the second deployed condition covers portions of the reclined occupant's head 22 that are not covered by the curtain airbag 84 when the seat back 36 is in the reclined condition, but that would have been covered by the curtain airbag if the seat back was in the upright/non-reclined condition.

Accordingly, the airbag 16 in the second deployed condition is configured to extend a second vertical distance V2 along the length 72 of the seat back 36 so that the upper extent 74 of the side airbag terminates at or above the headrest 38 of the vehicle seat 18. In the second deployed condition, the upper extent 88 of the side airbag 16 is vertically spaced closer to the vehicle roof 42 than the upper extent 76 of the headrest 38 when the seat back 36 is in the reclined condition. The second vertical distance V2 of the side airbag 16 in the second deployed condition is greater than the first vertical distance V1 of the side airbag in the first deployed condition. Therefore, the side airbag 16 in the second deployed condition extends further in the roofward direction C than what the side airbag does in the first deployed condition and is configured to cover portions of the occupant's head 22 that would have been left uncovered by the side airbag if the side airbag were to have deployed to the first deployed condition while the seat back 36 and the occupant 12 were reclined.

The thorax portion 80 of the side airbag 16 is inflated and deployed in the second deployed condition to cover the occupant's thorax 26 and help prevent the occupant's thorax 26 from impacting the side structure 54. The thorax portion 80 can also be configured to cover, in addition to the thorax 26, other portions of the occupant 12, such as, but not limited to, the occupant's torso 24. Unlike in the first deployed condition, the head portion 82 of the side airbag 16 is free to inflate and deploy in the second deployed condition to cover portions of the reclined occupant's head 22 left uncovered by the curtain airbag 84 and help prevent the occupant's head from impacting the side structure 54. The inflation and deployment of the head portion 82 causes the side airbag 16 to extend the second vertical distance V2 when the side airbag deploys to the second deployed condition instead of extending the first vertical distance V1, as will be discussed below.

In the reclined condition of the occupant 12 and the vehicle seat 18, the side airbag 16 extending the first vertical distance V1 would not extend far enough to adequately cover the occupant's head 22 and/or portions of the occupant's head left uncovered by the curtain airbag 84. By deploying the head portion 82 of the side airbag 16 in addition to the thorax portion 80 of the side airbag, the side airbag is able to extend the second vertical distance V2 and extend far enough to adequately cover the occupant's head 22 and/or portions of the occupant's head left uncovered by the curtain airbag 84. Thus, when the vehicle seat 18 is in the reclined condition at the time of a deployment event, the thorax portion 80 of the side airbag 16 covers the thorax 26 of the reclined occupant 12 while one of the head portion 82 and a combination of the head portion and the curtain airbag 84 covers the head 22 of the reclined occupant. In other words, when the side airbag 16 is in the second deployed condition, the thorax portion 80 of the side airbag 16 covers the reclined occupant's thorax 26 and either the head portion 82 of the side airbag covers the head 22 of the reclined occupant (for a situation in which the entirety of the reclined occupant's head falls below the curtain airbag 84), or the curtain airbag covers a portion of the occupant's head while the head portion of the side airbag covers a portion of the occupant's head not covered by the curtain airbag (for a situation in which only a portion of the reclined occupant's head falls below the curtain airbag).

The side airbag 16 in the second deployed condition is also configured to extend a second longitudinal distance L2 measured from a forward extent 90 of the deployed side airbag 16 furthest in a vehicle forward direction B toward a vehicle rearward direction A. The second longitudinal distance L2 can be greater than or equal to the second vertical distance V2, so that the side airbag 16 either extends further in the rearward direction C than it does in the roofward direction B or extends equally in both the rearward and roofward directions. The second longitudinal distance L2 of the side airbag 16 in the second deployed condition is greater than the first longitudinal distance L1 of the side airbag in the first deployed condition. This is because the likely position of the reclined occupant's head 22 is positioned further in the vehicle rearward direction A than what the likely position of the upright occupant's head would be. Thus, in order to account for the reclined occupant's head 22 being positioned further in the rearward direction A, the side airbag 16 in the second deployed condition desirably extends further in the rearward direction to help protect the reclined occupant's head.

To determine whether the seat back 36, and accordingly the occupant 12, is in either the upright condition or the reclined condition, the apparatus 10 can include a sensor for making this determination, such as at least one seat back sensor, illustrated schematically at 92, for sensing the angle of the seat back in relation to the seat base 34 of the vehicle seat 18. The seat back sensor 92 can be at least one of an inclinometer, a rotary potentiometer, a flexible potentiometer, an optical sensor, an ultrasonic radar, a motion sensor, a pressure sensor, any other sensor capable of ascertaining the angle of the seat back 36, or any combination thereof. The seat back sensor 92 can also be a switch indicative of whether the seat back 36 is at or beyond a predetermined reclined position. The seat back sensor 92 can be in electrical communication with a controller 93, via lead wires 96, that controls the operation of a release mechanism 94, via lead wires 97, to control whether the side airbag 16 deploys to either the first or second deployed condition. The controller 93 can be a part of an airbag control module (not shown) or separate from the airbag control module.

The release mechanism 94 can be a part of the airbag module 60. The release mechanism 94 is directly or indirectly releasably connected to the head portion 82 of the side airbag 16 so that the head portion can be directly/indirectly releasably connected to the airbag module 60 at the release mechanism. In particular, the release mechanism 94 can be one of directly and indirectly releasably connected to an interior surface 98 of the side airbag 16 at the head portion 82 of the side airbag. The release mechanism 94 may, for example, be an actuatable fastener, such as a pyrotechnic bolt, that is actuatable to break or release the direct/indirect connection of the release mechanism to the head portion 82 of the side airbag 16. Those skilled in the art will appreciate that alternative release mechanisms 94 could be utilized. For example, the release mechanism 94 may comprise an actuatable latch, a solenoid mechanism, or actuatable cutters or shears. Those skilled in the art will appreciate that the release mechanism 94 can be indirectly or directly releasably connected to the head portion of the side airbag 16 in any known manner. For example, in the example configuration shown in FIGS. 2-3, the release mechanism 94 is indirectly releasably connected to the head portion 82 of the side airbag 16 through a tether 100. In this case, the release mechanism 94 is releasably connected to a second tether end 102 of the tether 100, such that the second tether end is releasably connected to the airbag module 60 at the release mechanism. The tether 100 has a first tether end 104 that is connected to a portion of the head portion 82 of the airbag 16, such as to the interior surface 98 of the side airbag at the head portion. This connection can be established by known means, such as stitching or ultrasonic welding.

Upon sensing the occurrence of a deployment event for which inflation of the side airbag 16 is desired, such as a vehicle collision, the seat back sensor 92 senses the angle of the seat back 36 in relation to the seat base 34 of the vehicle seat 18. The seat back sensor 92 then transmits a signal, via the lead wires 96, to the controller 93 indicating the sensed angled of the seat back 36. If the controller 93 determines from the signal from the seat back sensor 92 that the seat back 36 is at an angle indicative of the upright/non-reclined condition at the time of the deployment event, the controller determines that the seat back of the vehicle seat 18 is in the non-reclined condition. The upright/non-reclined condition can, for example, be determined when the seat back 36 is at or below a predetermined angle a, as shown in FIG. 2.

In response to determining that the seat back 36 is in the upright/non-reclined condition, the controller 53 then transmits a signal, via the lead wires 97, to the release mechanism 94 to command the release mechanism to maintain the connection between the release mechanism and the head portion 82 of the side airbag 16. If the release mechanism 94 is directly connected to the head portion 82 of the side airbag 16, the release mechanism maintains the connection between the release mechanism and the head portion. If the release mechanism 94 is indirectly connected to the head portion 82, such as through the tether 100, as shown in the example configuration of FIG. 2, the release mechanism maintains the connection between the release mechanism and the tether. The collision sensor 68 provides a signal to the inflator 64 via the lead wires 70. Upon receiving the signal from the collision sensor 68, the inflator 64 is actuated and provides inflation fluid to the inflatable volume 66 of the side airbag 16 in any known manner. The inflating side airbag 16 exerts a force on the rupturable seam of the seat back 36, which moves the rupturable seam to the opened condition.

Figure 4A:
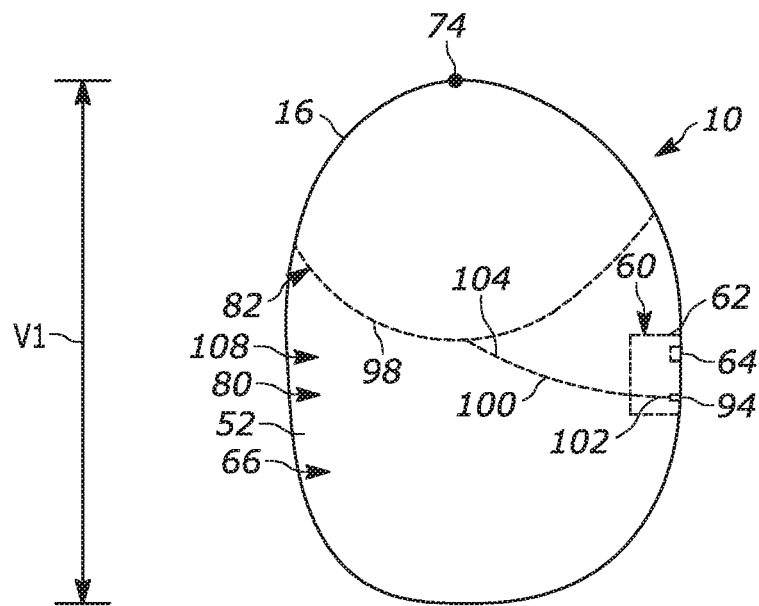
FIG. 4A is a side view of an element of the aspect of FIG. 2.
Figure 4B:
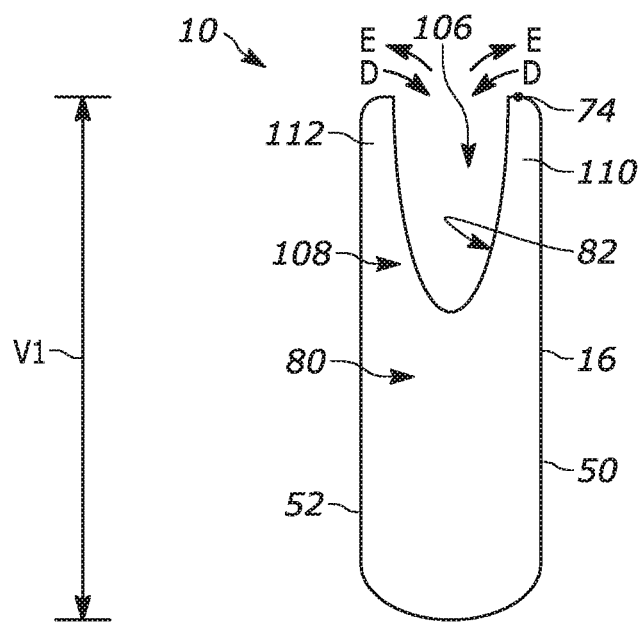
FIG. 4B is a front view of an element of the aspect of FIG. 2.

As a result of the maintained connection between the release mechanism 94 and the head portion 82 of the side airbag 16, the head portion is substantially prevented from inflating and deploying while the thorax portion 80 of the side airbag deploys substantially unrestricted. The prevention of the deployment of the head portion 82 causes the side airbag 16 to deploy to the first deployed condition and extend the first vertical distance V1, as shown in FIGS. 2 and 4A-B. Without the restriction of the head portion 82, the side airbag 16 would substantially deploy to the second deployed condition and extend the second vertical distance V2. As shown in FIGS. 4A-4B, because the release mechanism 94 is connected to the interior surface 98 of the side airbag 16 at the head portion 82 of the side airbag and the thorax portion 80 is free to deploy substantially unrestricted, the thorax portion of the side airbag inflates at least partially around the restricted head portion as the side airbag deploys so that the restricted head portion is inwardly folded into the thorax portion of the side airbag when the side airbag is in the first deployed condition. Thus, the maintained connection between the release mechanism 94 and the interior surface 98 of the side airbag 16 at the head portion 82 causes the head portion to be inverted into the thorax portion 80 of the side airbag when the side airbag is in the first deployed condition. The inwardly folded head portion 82 of the side airbag 16 forms a space 106 in a central portion 108 of the thorax portion 80 so that an inboard folded portion 110 of the thorax portion is separated from an outboard folded portion 112 of the thorax portion by the space.

By maintaining the connection between the release mechanism 94 and the head portion 82, the side airbag 16 inflates and deploys to the first deployed condition in which the head portion of the side airbag is rotated/inwardly folded (in the direction of arrows identified at "D" in FIG. 4B) from the deployed position of the head portion of the side airbag in the second deployed condition. In short, the deployed position of the head portion 82 of the side airbag 16 in the first deployed condition is substantially in a position which is rotated/inwardly folded (in the direction of the arrows D in FIG. 4B) from the deployed position of the head portion of the side airbag in the second deployed condition, which can be seen in FIGS. 3 and 5A-B. The maintained connection between the release mechanism 94 and the head portion 82 holds the deployed side airbag 16 in the first deployed condition so that the head portion of the side airbag 16 is substantially prevented from rotating/outwardly folding in the roofward direction C, in a trajectory indicated by arrows identified at "E" in FIG. 4B, toward the second deployed condition. As a result of the maintained connection between of the release mechanism 94 to the head portion 82 of the side airbag 16, the head portion of the side airbag is substantially prevented from unfolding outward from the thorax portion 80 in the roofward direction C toward the second deployed condition.

Figure 5A:
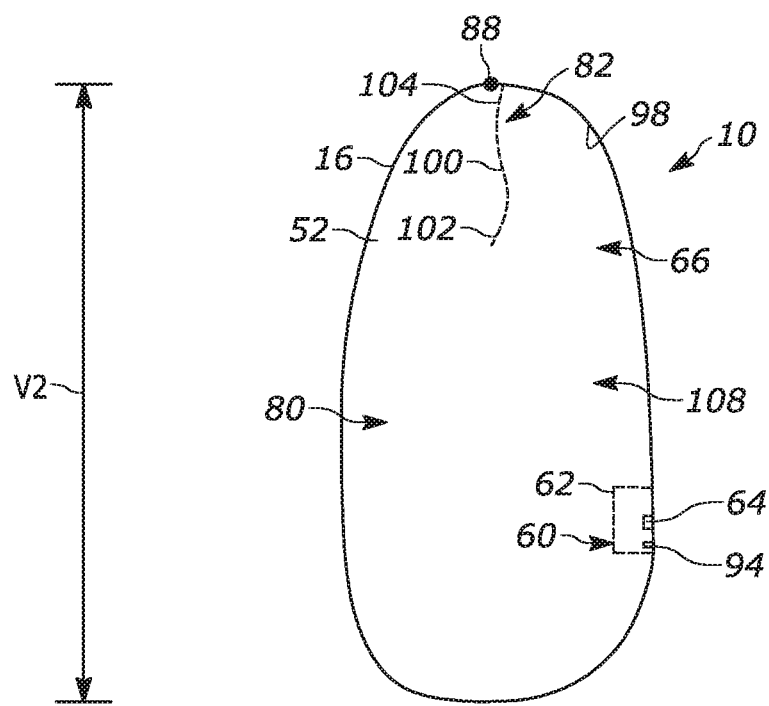
FIG. 5A is a side view of an element of the aspect of FIG. 3.
Figure 5B:
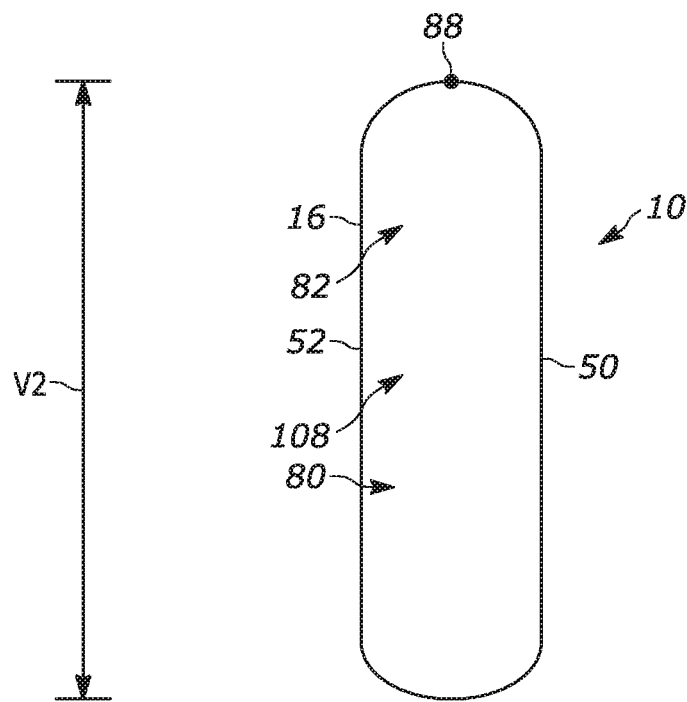
FIG. 5B is a front view of an element of the aspect of FIG. 3.

If the controller 93 determines from the signal from the seat back sensor 92 that the seat back 36 is at an angle indicative of the reclined condition at the time of the deployment event, the controller determines that the seat back of the vehicle seat 18 is in the reclined condition. The reclined condition can, for example, be determined when the seat back 36 is greater than the predetermined angle a, such as at an angle β, as shown in FIG. 3. In response to determining that the seat back 36 is in the reclined condition, the controller 93 then transmits a signal, via the lead wires 97, to the release mechanism 94 to actuate the release mechanism to release the connection between the release mechanism and the head portion 82. If the release mechanism 94 is directly connected to the head portion 82 of the side airbag 16, the release mechanism releases the connection between the release mechanism and the head portion. If the release mechanism 94 is indirectly connected to the head portion 82, such as through the tether 100, as shown in the example configuration of FIGS. 2-3, the release mechanism releases the connection between the release mechanism and the second tether end 102 of the tether. With the connection between the release mechanism 94 and the head portion 82 released, the side airbag 16 deploys to the second deployed condition and extends the second vertical distance V2 when the inflator 64 provides inflation fluid to the inflatable volume 66 of the side airbag 16, as shown in FIGS. 3 and 5A-B.

The release of the connection between the release mechanism 94 and the head portion 82 as the side airbag 16 inflates permits the head portion, which would have been otherwise unable to substantially inflate due to being substantially prevented from deploying, to inflate so that the side airbag inflates to the second deployed condition and extends the second vertical distance V2. If the connection between the release mechanism 94 and the head portion 82 would have been maintained, the side airbag 16 would have deployed to the first deployed condition and extended the first vertical distance V1, as discussed above. Thus, by releasing the connection between the release mechanism 94 and the head portion 82 and inflating the head portion, the head portion is rotated/outwardly folded in the roofward direction C and in a trajectory indicated by the arrows E from the position of the head portion in the first deployed position so that the side airbag deploys to the second deployed position. The release of the connection between the release mechanism 94 and the head portion 82 permits the head portion to inflate and unfold from the central portion 108 of the thorax portion 80 so that the side airbag 16 extends the second vertical distance V2.

Instead of the release mechanism 94 being releasably connected to the second tether end 102 of the tether 100, as illustrated in the example configuration of FIGS. 2-5B, the release mechanism can be releasably connected to a central tether portion 114, as depicted in the example configuration of FIGS. 6-8B. In this example configuration, the first tether end 104 is connected to the interior surface 98 of the side airbag 16 at the head portion 82, the central tether portion 114 is releasably connected to the airbag module 60 at the tether release mechanism 94, and the second tether end 102 is connected to connected to the interior surface of the side airbag at a location that is opposite to the first tether end, such as at a lower interior portion 116 of the thorax portion 80 of the side airbag. In this case, the tether 100 configuration of FIGS. 6-8B operates the same manner as described in FIGS. 2-3, except that instead of maintaining or releasing the connection between the release mechanism 94 and the second tether end 102, the connection between the release mechanism and the central tether portion 114 is maintained or released.

Figure 6:
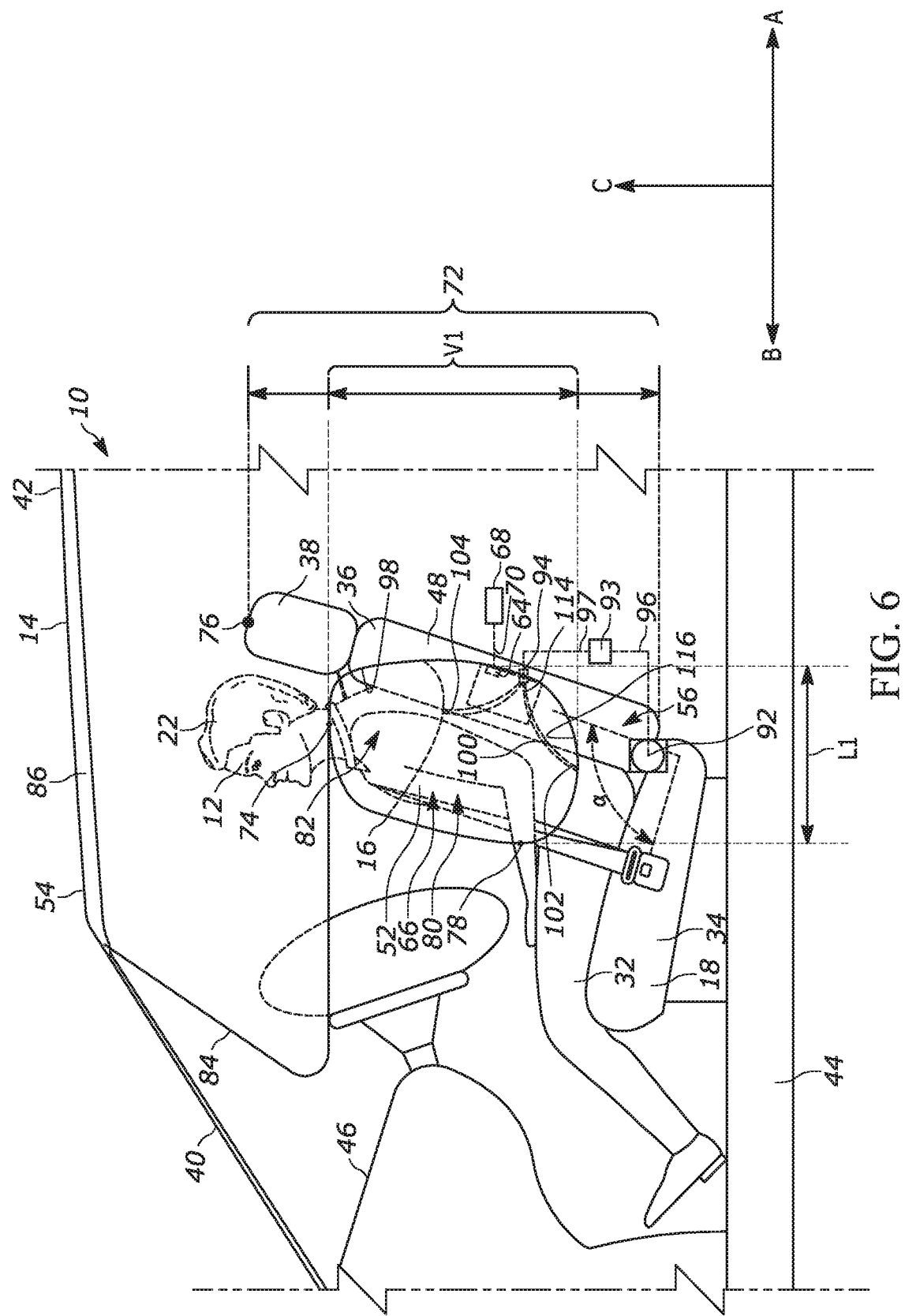
FIG. 6 is a schematic side view illustrating the apparatus of FIG. 1 in the first condition, including another configuration for a portion of the apparatus.
Figure 7:
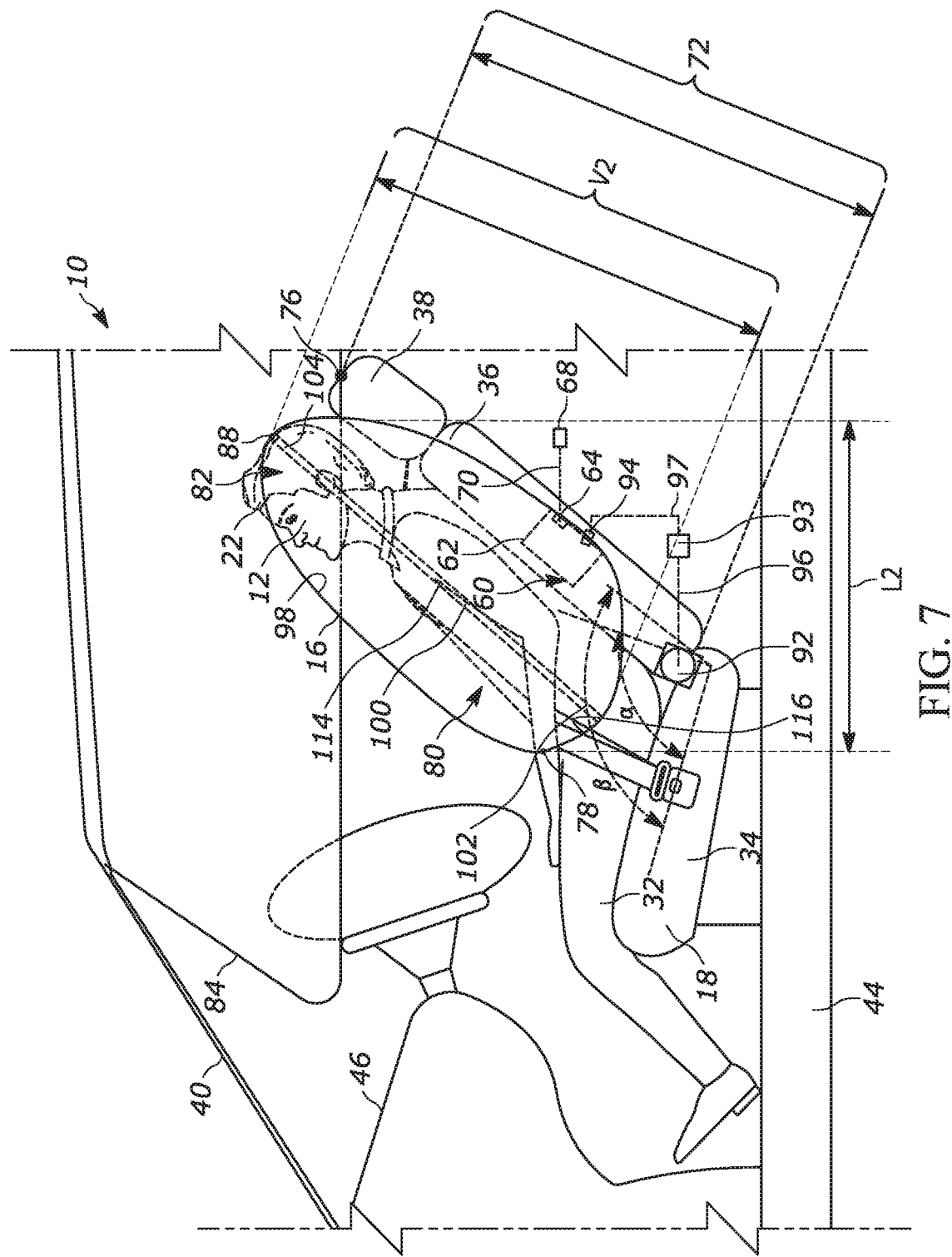
FIG. 7 is a schematic side view illustrating the apparatus of FIG. 6 in the second condition.
Figure 8A:
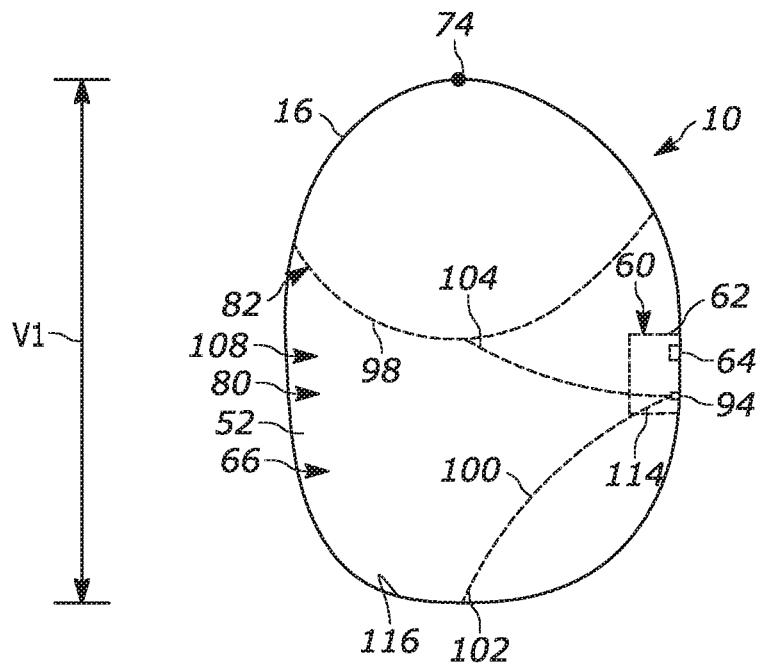
FIG. 8A is a side view of an element of the aspect of FIG. 6.
Figure 8B:
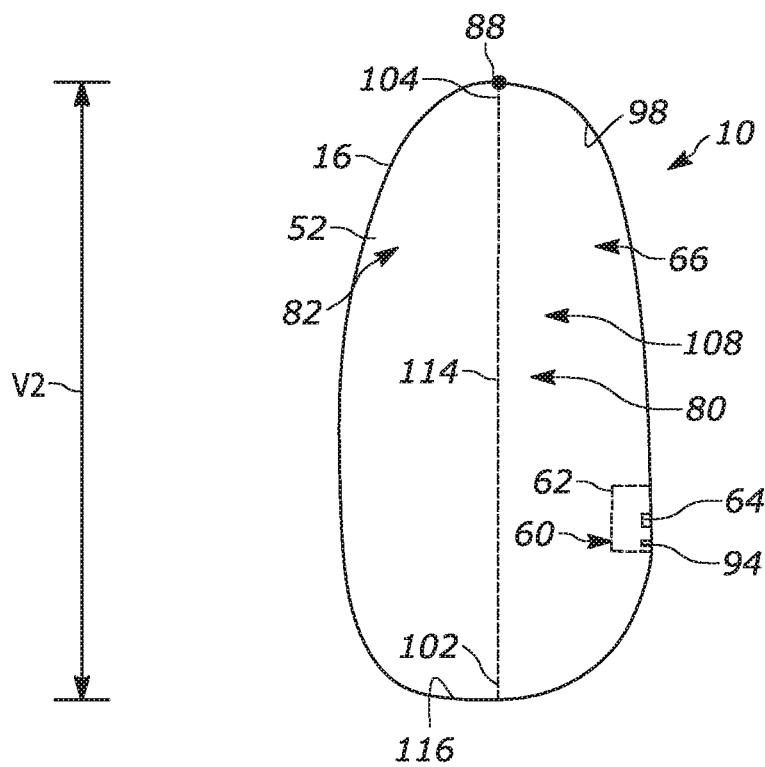
FIG. 8B is a side view of an element of the aspect of FIG. 7.

As shown in FIGS. 6 and 8A, when the side airbag 16 is in the first deployed condition, the connection between the release mechanism 94 and the central tether portion 114 is maintained so that the side airbag deploys to the first deployed condition and extends the first vertical distance V1. The three-point connection of the first tether end 104 to the head portion 82, the central tether portion 114 to the release mechanism 94, and the second tether end 102 to the lower interior portion 116 shapes the side airbag 16 so that the side airbag deploys to the first deployed condition and extends the first vertical distance V1, and restricts the inflation and deployment of the head portion. As shown in FIGS. 7 and 8B, when the side airbag 16 is in the second deployed condition, the connection between the release mechanism 94 and the central tether portion 114 is released so that the side airbag deploys to the second deployed condition and extends the second vertical distance V2. As a result of the first and second tether ends 104, 102 being connected to the interior surface 98 of the side airbag 16 at opposing locations, the tether 100 shapes the side airbag when the side airbag is deployed to the second deployed condition. When the connection of the release mechanism 94 to the central tether portion 114 is released, the connection of the first tether end 104 to the head portion 82 and the connection of the second tether end 102 to the lower interior portion 116 shapes the inflated and deployed side airbag 16 so that the side airbag deploys to the second deployed condition and extends the second vertical distance V2. Those skilled in the art will understand that although the first and second tether ends 104, 102 are described as being connected to the interior surface 98 of the side airbag 16 at opposing locations in the example configuration of FIGS. 6-8B, the first and second tether ends can be connected to the interior surface of the side airbag at any location that will cause the side airbag to deploy to the first and second deployed conditions in the manner as described above.

Alternatively, instead of the release mechanism 94 being directly releasably connected to the second tether end 102 of the tether 100, as illustrated in the configuration of FIGS. 2-5B, the release mechanism can be indirectly releasably connected to the second tether end through a separate, single length of tether material 118, as depicted in the configuration of FIGS. 9-13B. In this case, the tether 100 is in the form of a shaping tether. The single length of tether material 118 includes a portion comprising an anchor tether 120 and a portion comprising a trigger tether 122. In this configuration, the shaping tether 100, the anchor tether 120 and the trigger tether 122 form a three-leg tether system 124 in which the anchor tether and the trigger tether are segments of the single length of tether material 118, and the shaping tether is its own separate length of tether material.

The anchor tether 120 has a first end portion 126 anchored to the vehicle 14. Anchoring the anchor tether 120 to the vehicle 14 could be achieved in many different manners. The anchor tether 120 could, for example, be secured to the side airbag 16 (e.g., to the interior surface 98 of the side airbag, the inboard panel 50 of the side airbag, the outboard panel 52 of the side airbag, or to the side airbag at a location near a mouth portion of the side airbag where the side airbag is secured to the housing 62), or to a structure of the vehicle 14, such as the airbag module 60 (e.g., the housing), the seat back 36, or structures within the seat back. In the configuration illustrated in FIGS. 9-13B, the anchor tether 120 is secured to the housing 62.

The first tether end 104 of the shaping tether 100 is connected to a portion of the head portion 82 of the side airbag 16, such as to the interior surface 98 of the side airbag at the head portion. This connection can be established by known means, such as stitching or ultrasonic welding. The trigger tether 122 has a first end portion 128 secured to a support structure in the vehicle 14, such as the housing 62, by the release mechanism 94. The release mechanism 94 can, for example, be an actuatable fastener, such as a pyrotechnic bolt, that is actuatable to break or release the connection of the first end portion 128 of the trigger tether 122 to the housing 62.

Figure 11:
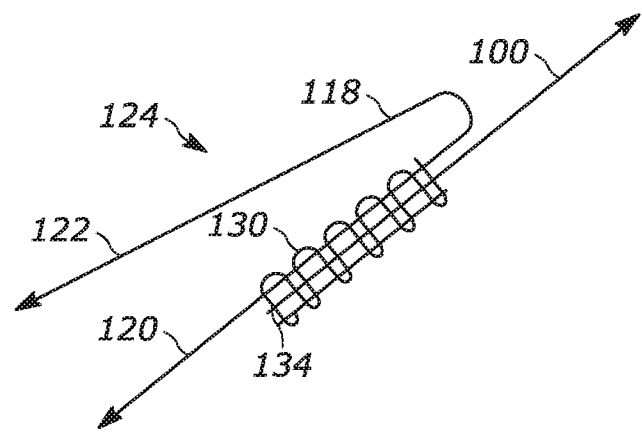
FIGS. 11-12 are schematic illustrations of a portion of the apparatus of FIGS. 9 and 10.

In an unactuated condition of the tether system 124, the anchor tether 120, the shaping tether 100, and the trigger tether 122 are interconnected. This is shown in detail in FIGS. 11-12. As shown in FIG. 11, the anchor tether 120 and the trigger tether 122 are segments of the single length of tether material 118. The shaping tether 100 is a separate length of tether material. A releasable connection 130 interconnects the shaping tether 100 to the single length of tether material 118 at or near the interface between the anchor tether 120 and the trigger tether 122. In the illustrated embodiment, the releasable connection 130 comprises releasable tear stitching. Thus, the releasable connection 130 may be alternatively referred to as the tear stitching 130. The releasable connection 130 could, however, have alternative connection or construction. For example, the releasable connection 130 could comprise a releasable bonding agent, such as an adhesive or tape, or a releasable mechanical device, such as a rivet or staple.

Figure 12:
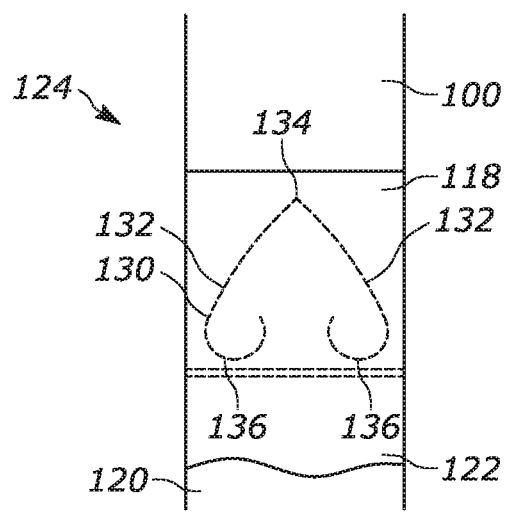

According to the configuration of FIGS. 9-13B, a rupturable tear stitch configuration that promotes predictability, repeatability, and reliability in releasing interconnected fabrics is used to form the tear stitching 130. FIGS. 11-12 illustrate by way of example tear stitching 130 in accordance with the configuration of FIGS. 9-13B. Referring to FIGS. 11-12, the tear stitching 130 has an inverted V-shaped configuration with outwardly diverging segments 132 or legs that meet at a break point 134. Terminal end portions 136 of the segments 132 have an inwardly curved configuration that terminates short of intersecting its associated segment.

The tear stitching 130 is configured to rupture in response to the tension applied to the shaping tether 100 and the trigger tether 122 during deployment of the side airbag 16. According to the configuration of FIGS. 9-13B, the tear stitching 130 is adapted to release the connection between the anchor tether 120 and the shaping tether 100 depending on condition of the seat back 36, and accordingly the occupant 12, when the side airbag 16 is deployed.

The side airbag 16 and the tether system 124 are constructed and arranged such that the amount of tension sufficient to rupture the tear stitching 130 differs between the shaping tether 100 and the trigger tether 122. Tension applied to the tear stitching 130 by the shaping tether 100 acts generally parallel to the anchor tether 120. This helps distribute the tension force over the end portions 136 and the segments 132 of the tear stitching 130. The tear stitching 130 may thus offer a relatively high resistance to rupture in response to tension applied by the shaping tether 100 and the anchor tether 120 (referred to herein as "shaping strength").

Tension applied to the tear stitching 130 by the shaping tether 100 and the trigger tether 122 acts at an angle to the anchor tether 120 (see FIG. 11) and thus produces a "peeling" force or action between the trigger tether and the shaping tether. This peeling action helps focus the tension on the break point 134 of the tear stitching 130. Peeling force depends on pulling the trigger tether 122 back along the stitching 130 and the stitched portion of the anchor tether 120. Ideally, tension pulling the trigger tether 122 parallel to the anchor tether 120 and the plane of the stitching 130 produces a pulling force that is the strongest and the most focused on the break point 134. Tension pulling the trigger tether 122 substantially in this direction, as shown for example in FIG. 11, can provide a peeling force that is sufficiently strong and focused.

Due to the strength and focusing properties of the peeling force applied by the trigger tether 122, the tear stitching 130 may thus offer a relatively lower resistance rupture in response to tension applied by the shaping tether 100 and the trigger tether (referred to herein as "trigger strength"). The tether system 124 thus may have a relatively high shaping strength and a correspondingly low trigger strength. Because of this, the rupture strength of the tear stitching 130 may be selected to have a desired combination of shaping and trigger strengths. This can be achieved, for example, through the careful selection of the thread material, stitch pattern, number of stitches, and/or thread pattern.

According to the configuration of FIGS. 9-13B, the segment of the single length of tether material 118 forming the trigger tether 122 has a length that is shorter than the length of the segment of the single length of tether material forming the anchor tether 120. Due to this configuration, those skilled in the art will appreciate that, in response to deployment of the side airbag 16, tension will be applied to the tear stitching 130 by the trigger tether 122 and the shaping tether 100. This is the case, of course, as long as the connection between the trigger tether 122 and the housing 62 is maintained by the release mechanism 94.

If the release mechanism 94 remains unactuated and maintains the connection of the trigger tether 122 to the housing 62, then tension is applied to the tear stitching 130 by the shaping tether 100 and the trigger tether, due to the trigger tether being shorter than the anchor tether 120. As a result, the peeling action focuses the tension on the break point 134. When the tension on the trigger tether 122 exceeds the trigger strength, the tear stitching 130 ruptures beginning at the break point 134. The rupture then travels along the curved segments 132 until the trigger tether 122 and the shaping tether 100 are released from each other.

If the release mechanism 94 is actuated and releases the connection of the trigger tether 122 to the housing 62, then tension is applied to the tear stitching 130 by the shaping tether 100 and the anchor tether 120, since the trigger tether is no longer anchored to the vehicle 14. As a result, the connection between the shaping tether 100 and the anchor tether 120 relies on the shaping strength of the tear stitching 130. The shaping strength of the tear stitching 130 may preferably be configured to withstand the force of inflation and deployment of the thorax portion 80 of the side airbag 16. As a result, the shaping tether 100 and the anchor tether 120 combine to restrict deployment of the head portion 82 of the side airbag 16, and thereby restrict or limit the side airbag to the first deployed condition, as will be described in more detail below.

The shaping strength and trigger strength of the tear stitching 130 can be tailored to desired values through a variety of configurable characteristics. For example, the material used to construct the tear stitching 130 may be selected to have material properties that help provide the desired shaping and tear strengths. Also, the stitching itself (i.e., stitches per inch, type of stitch) may be selected to have material properties that help provide the desired shaping and tear strengths. Further, the shape of the tear stitching 130 may differ from the V-shaped configurations illustrated in FIGS. 11-12 and may be selected to have material properties that help provide the desired shaping and tear strengths.

According to the configuration of FIGS. 9-13B, in response to determining that the seat back 36 is in the upright/non-reclined condition upon the occurrence of a deployment event for which inflation of the side airbag 16 is desired (see FIG. 9), the controller 93 transmits a signal, via the lead wires 97, to the release mechanism 94 to actuate the release mechanism to release the connection between the release mechanism and the trigger tether 122. As a result, the trigger tether 122 does not apply any tension or force on the tear stitching 130 (see FIGS. 11-12). Because of this, the shaping tether 100 and the anchor tether 120 become tensioned by at least the deploying thorax portion 80 of the side airbag 16. When this occurs, the tension in the shaping tether 100 and the anchor tether 120 is applied to the tear stitching 130, which connects the two tethers.

Figure 9:
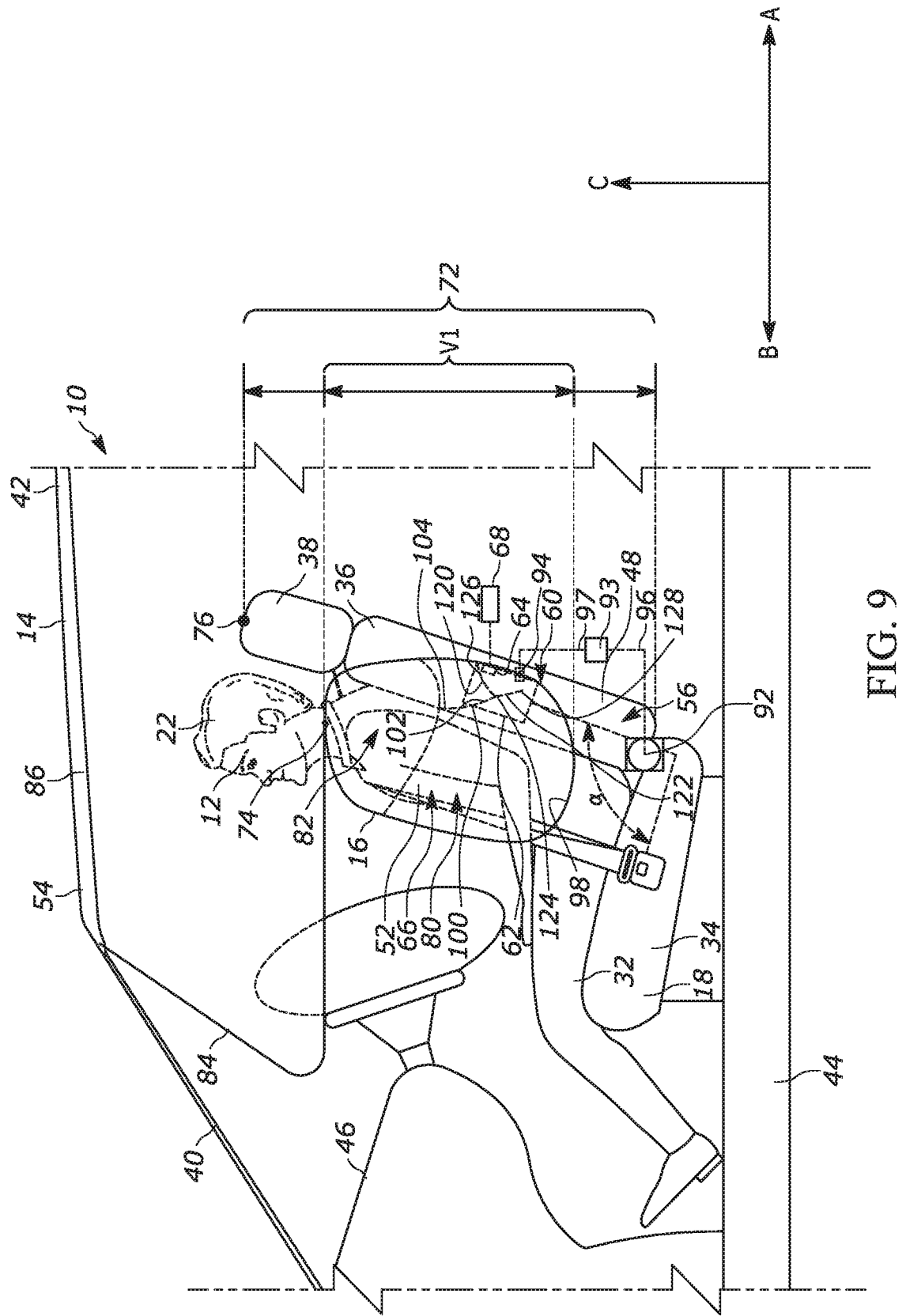
FIG. 9 is a schematic side view illustrating the apparatus of FIG. 1 in the first condition, including another configuration for a portion of the apparatus.
Figure 13A:
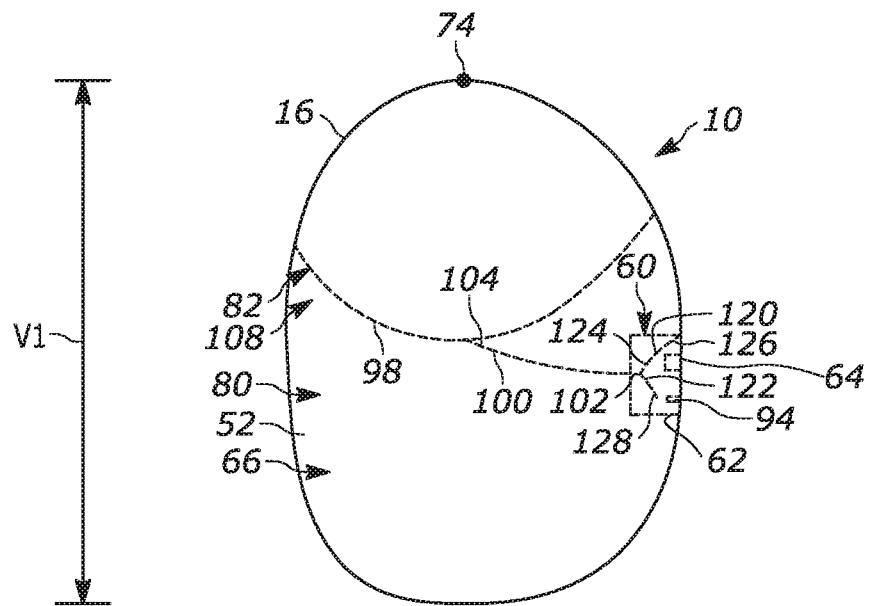
FIG. 13A is a side view of an element of the aspect of FIG. 9.
Figure 13B:
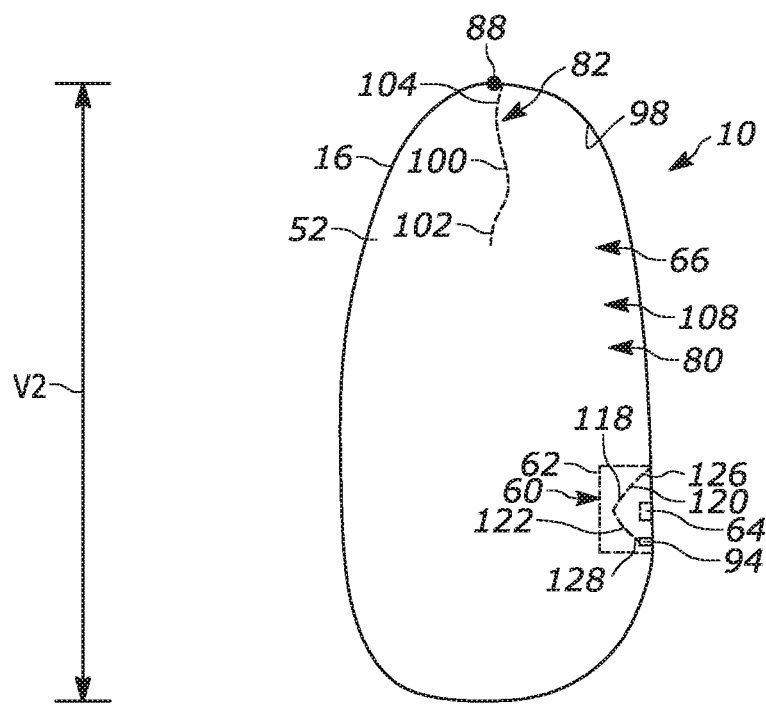
FIG. 13B is a side view of an element of the aspect of FIG. 10.

Since, as described above, the tear stitching 130 has a relatively high shaping strength configured to withstand relatively high tension forces between the shaping tether 100 and the anchor tether 120, the tear stitching does not rupture in the event of the upright/non-reclined condition of the seat back 36 of FIG. 9. As shown in FIGS. 9 and 13A, as a result of the maintained connection between the shaping tether 100 and the anchor tether 120, the head portion 82 of the side airbag 16 is substantially restricted from inflating and substantially prevented from unfolding outward in the roofward direction C toward the second deployed condition so that the side airbag inflates and deploys from the stored condition to the first deployed condition, in a similar manner as described above.

According to the configuration of FIGS. 9-13B, in response to determining that the seat back 36 is in the reclined condition upon the occurrence of a deployment event for which inflation of the side airbag 16 is desired (see FIG. 10), the controller 93 transmits a signal, via the lead wires 97, to the release mechanism 94 to command the release mechanism to maintain the connection between the release mechanism and the trigger tether 122. As a result, the trigger tether 122 remains anchored in the vehicle 14 and therefore applies a tension or force on the tear stitching 130 (see FIGS. 11-12). Because of this, the trigger tether 122 becomes tensioned under the force of the deploying head portion 82 and the trigger tether applies a significant tension or force on the tear stitching 130.

Figure 10:
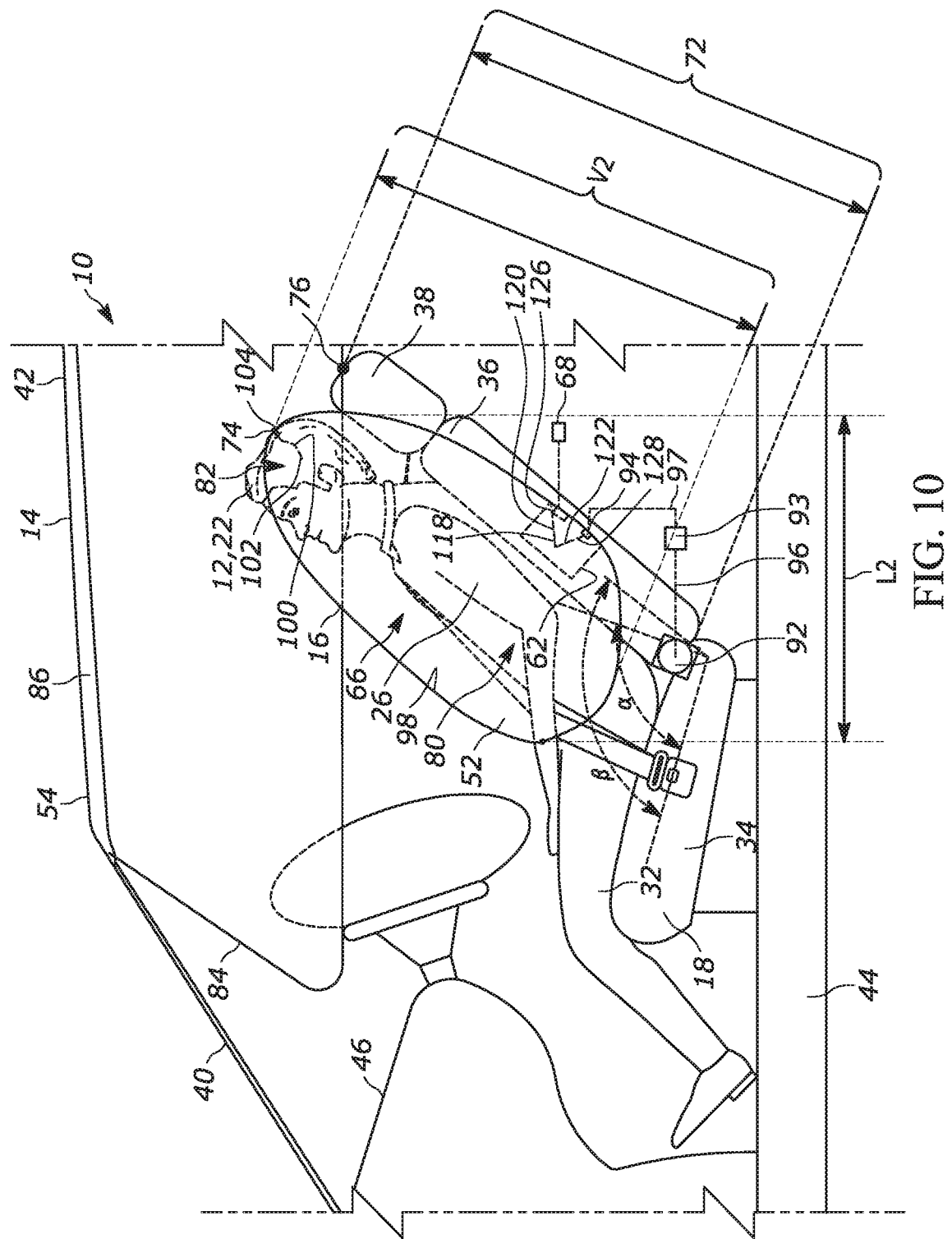
FIG. 10 is a schematic side view illustrating the apparatus of FIG. 9 in the second condition.

Since, as described above, the tear stitching 130 has a relatively low trigger strength configured to rupture under relatively low tension forces between the trigger tether 122 and the shaping tether 100, the tear stitching ruptures in the event of the reclined condition of the seat back 36 of FIG. 10. This releases the connection between the anchor tether 120 and the shaping tether 100. As a result, the shaping tether 100 does not cause a portion of the head portion 82 to be restricted from inflating and deploying so that the side airbag 16 inflates and deploys from the stored condition to the first deployed condition, and instead the side airbag inflates and deploys from the stored condition to the second deployed condition illustrated in FIGS. 10 and 13B, in a similar manner as described above.

From the above description of the invention, those skilled in the art will perceive improvements, changes and modifications. For example, although in at least one of the example configurations of the apparatus 10 the release mechanism 94 has been described as being directly/indirectly connected to the interior surface 98 of the side airbag 16, it is contemplated that the release mechanism can be directly/indirectly attached to an outer surface of the side airbag in such a manner that the side airbag can deploy to one of the first and second deployed conditions in the manner described above. Further, although various configurations of the apparatus 10 include tethers being attached to the interior surface 98 of the side airbag 16, it is contemplated that the tethers can be connected to an outer surface of the side airbag in such a manner that the side airbag can deploy to one of the first and second deployed conditions in the manner described above. Such improvements, changes and modifications within the skill of the art are intended to be covered by the appended claims.

Having described the invention, the following is claimed:

1. An apparatus for helping to protect an occupant of a vehicle, comprising:
    an airbag configured to be mounted to a seat back of a vehicle seat and being inflatable between the seat back and an adjacent side structure of the vehicle to one of a first deployed condition in which the airbag is configured for a non-reclined condition of the vehicle seat, and a second deployed condition in which the airbag is configured for a reclined condition of the vehicle seat;
    wherein the airbag in the first deployed condition is configured to extend a first vertical distance along a length of the seat back, and the airbag in the second deployed condition is configured to extend a second vertical distance along the length of the seat back, the second vertical distance being greater than the first vertical distance; and
    wherein the airbag is configured to deploy to the first deployed condition in response to determining a non-reclined condition of the vehicle seat and to the second deployed condition in response to determining a reclined condition of the vehicle seat.

2. The apparatus recited in claim 1, further comprising:
    an airbag module mounted to the seat back, the airbag module including the airbag, a structure for supporting the airbag in a stored condition, and at least one inflator for inflating the airbag; and
    a release mechanism for controlling whether the airbag deploys to the first deployed condition or the second deployed condition, the release mechanism being releasably connected to a head portion of the airbag;
    wherein in the first deployed condition, the connection between the release mechanism and the head portion is maintained so that the airbag deploys to the first deployed condition, and in the second deployed condition, the connection between the release mechanism and the head portion is released so that the airbag deploys to the second deployed condition.

3. The apparatus recited in claim 2, wherein the connection of the release mechanism to the airbag is direct or indirect.

4. The apparatus recited in claim 2, wherein the release mechanism is releasably connected to an interior surface of the airbag at the head portion of the airbag.

5. The apparatus recited in claim 2, wherein as a result of the maintained connection of the release mechanism to the head portion of the airbag, a thorax portion of the airbag inflates at least partially around the head portion of the airbag as the airbag deploys so that the head portion of the airbag is inwardly folded into the thorax portion of the airbag when the airbag is in the first deployed condition.

6. The apparatus recited in claim 5, wherein the inwardly folded head portion of the airbag forms a space in a central portion of the thorax portion so that an inboard folded portion of the thorax portion is separated from an outboard folded portion of the thorax portion by the space.

7. The apparatus recited in claim 5, wherein as a result of the maintained connection of the release mechanism to the head portion of the airbag, the head portion of the airbag is substantially prevented from unfolding outward from the thorax portion in a roofward direction toward the second deployed condition.

8. The apparatus recited in claim 2, wherein the release mechanism is indirectly connected to the head portion of the airbag through a tether, the tether having a first tether end connected to a portion of the head portion of the airbag, at least one of a second tether end and a central tether portion being releasably connected to the airbag module at the release mechanism; and
    wherein in the first deployed condition, the connection between the release mechanism and the tether is maintained so that the airbag deploys to the first deployed condition, and in the second deployed condition, the connection between the release mechanism and the tether is released so that the airbag deploys to the second deployed condition.

9. The apparatus recited in claim 8, wherein the second tether end is releasably connected to the airbag module at the release mechanism.

10. The apparatus recited in claim 8, wherein the first tether end is connected to an interior surface of the airbag at the head portion of the airbag.

11. The apparatus recited in claim 10, wherein the second tether end is connected to the interior surface of the airbag at a location that is opposite to the first tether end and the central tether portion is releasably connected to the airbag module at the release mechanism, and wherein as a result of the first and second tether ends being connected to the interior surface of the airbag at opposing locations, the tether shapes the airbag when the airbag is deployed to the second deployed condition.

12. The apparatus recited in claim 2, further comprising a sensor for sensing an angle of a seat back of the vehicle seat, the sensor being in electrical communication with a controller for controlling operation of the release mechanism;
  wherein the controller is operative to determine from a signal from the sensor a reclined condition of the vehicle seat in response to determining that the angle of the seat back is greater than a predetermined angle at the time of a deployment event and to actuate the release mechanism to release the connection between the release mechanism and the head portion so that the airbag deploys to the second deployed condition.

13. The apparatus recited in claim 2, further comprising a sensor for sensing an angle of a seat back of the vehicle seat, the sensor being in electrical communication with a controller for controlling operation of the release mechanism;
  wherein the controller is operative to determine from a signal from the sensor a non-reclined condition of the vehicle seat in response to determining that the angle of the seat back is below the predetermined angle at the time of a deployment event and to command the release mechanism to maintain the connection between the release mechanism and the head portion so that the airbag deploys to the first deployed condition.

14. The apparatus recited in claim 1, further comprising:
  a first tether having a first end connected to the seat back via a release mechanism, and an opposite second end connected to a housing for storing the airbag when the airbag is in the stored condition, the first tether having a first segment comprising a trigger tether and a second segment comprising an anchor tether, the trigger tether comprising the first end of the first tether, the anchor tether comprising the second end of the first tether; and
  a second tether comprising a shaping tether having a first end secured to the first tether by a releasable connection at a location between the first and second ends of the first tether, the second tether having a second end connected to a head portion of the airbag;
  wherein the release mechanism controls whether the airbag deploys to one of the first deployed condition and the second deployed condition, in the first deployed condition, the connection between the release mechanism and the trigger tether is released so that the airbag deploys to the first deployed condition, and in the second deployed condition, the connection between the release mechanism and the trigger tether is maintained so that the airbag deploys to the second deployed condition.

15. The apparatus recited in claim 14, wherein in the first deployed condition, the connection between the release mechanism and the trigger tether is released so that the releasable connection maintains the connection between the anchor tether and the shaping tether, the anchor tether and the shaping tether in combination holding the airbag in the first deployed condition so that the head portion of the airbag is substantially prevented from unfolding outward in a roofward direction toward the second deployed condition, and wherein in the second deployed condition, the connection between the release mechanism and the trigger tether is maintained so that the trigger tether becomes tensioned by the shaping tether due to deployment of the airbag, the trigger tether when tensioned rupturing the releasable connection which disconnects the shaping tether from the anchor tether and thereby permits the airbag to deploy to the second deployed condition.

16. The apparatus recited in claim 14, further comprising a sensor for sensing an angle of a seat back of the vehicle seat, the sensor being in electrical communication with a controller for controlling operation of the release mechanism;
  wherein the controller is operative to determine from a signal from the sensor a reclined condition of the vehicle seat in response to determining that the angle of the seat back is greater than a predetermined angle at the time of a deployment event and to command the release mechanism to maintain the connection between the release mechanism and the trigger tether so that the airbag deploys to the second deployed condition.

17. The apparatus recited in claim 14, further comprising a sensor for sensing an angle of a seat back of the vehicle seat, the sensor being in electrical communication with a controller for controlling operation of the release mechanism;
  wherein the controller is operative to determine from a signal from the sensor a non-reclined condition of the vehicle seat in response to determining the angle of the seat back is below the predetermined angle at the time of a deployment event and to actuate the release mechanism to release the connection between the release mechanism and the trigger tether so that the airbag deploys to the first deployed condition.

18. The apparatus recited in claim 1, wherein the airbag comprises a thorax portion for covering the thorax of the occupant and a head portion for covering the head of the occupant, the thorax portion being inflated and deployed while the head portion is substantially restricted from being inflated and deployed when the airbag is in the first deployed condition, both the thorax and head portions being inflated and deployed when the airbag is in the second deployed condition.

19. The apparatus recited in claim 18, further comprising a curtain airbag contained in a side structure of the vehicle when the curtain airbag is in the stored condition and being inflatable from the stored condition to a deployed condition in which the curtain airbag is deployed between the side structure and the vehicle occupant;
  wherein when the vehicle seat is in the non-reclined condition at the time of a deployment event, the curtain airbag covers the head of the occupant while the thorax portion of the airbag covers the thorax of the occupant; and
  wherein when the vehicle seat is in the reclined condition at the time of a deployment event, the thorax portion of the airbag covers the thorax of the occupant while one of the head portion and a combination of the head portion and the curtain airbag covers the head of the occupant.

20. An airbag module comprising the apparatus recited in claim 1.

21. A vehicle safety system comprising the airbag module recited in claim 20.

22. A vehicle safety system for helping to protect an occupant of a driverless vehicle comprising the airbag module recited in claim 20.

* * * * *